(12) United States Patent  (10) Patent No.: US 8,156,271 B2
Reece  (45) Date of Patent: Apr. 10, 2012

(54) SYSTEMS AND METHODS FOR STORAGE MANAGEMENT IN A DATA PROCESSING DEVICE

(75) Inventor: Russell Dean Reece, Foster City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/082,342

(22) Filed: Apr. 7, 2011

(65) Prior Publication Data

US 2011/0185033 A1    Jul. 28, 2011

Related U.S. Application Data

(62) Division of application No. 11/586,882, filed on Oct. 24, 2006, now Pat. No. 7,925,809.

(51) Int. Cl.
*G06F 3/01* (2006.01)

(52) U.S. Cl. .......................................... 710/74; 711/101

(58) Field of Classification Search ........................ None
See application file for complete search history.

(56) References Cited

U.S. PATENT DOCUMENTS

| | | |
|---|---|---|
| 5,499,378 A | 3/1996 | McNeill, Jr. et al. |
| 5,546,557 A | 8/1996 | Allen et al. |
| 5,604,906 A | 2/1997 | Murphy et al. |
| 5,649,133 A | 7/1997 | Arquie |
| 5,721,880 A | 2/1998 | McNeill, Jr. et al. |
| 5,968,170 A | 10/1999 | Gross et al. |
| 6,108,759 A | 8/2000 | Orcutt et al. |
| 6,154,810 A | 11/2000 | Derby et al. |
| 6,185,666 B1 | 2/2001 | Murray et al. |
| 6,253,300 B1 | 6/2001 | Lawrence et al. |
| 6,314,501 B1 | 11/2001 | Gulick et al. |
| 6,330,653 B1 * | 12/2001 | Murray et al. ................ 711/173 |
| 6,434,695 B1 | 8/2002 | Esfahani et al. |
| 6,453,383 B1 | 9/2002 | Stoddard et al. |
| 6,473,783 B2 | 10/2002 | Goshey et al. |
| 6,681,307 B1 | 1/2004 | Humlicek et al. |
| 6,725,328 B2 | 4/2004 | Kano et al. |
| 6,799,226 B1 | 9/2004 | Robbin et al. |
| 6,898,664 B2 | 5/2005 | Matthews et al. |
| 7,249,249 B2 * | 7/2007 | Freeman et al. .................. 713/1 |
| 7,263,589 B2 * | 8/2007 | Han et al. ...................... 711/163 |

(Continued)

OTHER PUBLICATIONS

Biersdorfer, J.D. *iPod & i Tunes: The Missing Manual*, 4th Edition, Mar. 2006, O'Reilly Media, Inc., p. 243.

*Primary Examiner* — Cheng-Yuan Tseng
(74) *Attorney, Agent, or Firm* — Blakely, Sokoloff, Taylor & Zafman LLP

(57) ABSTRACT

Methods and systems for storage management in a data processing device. The data processing device may be connected to a host computer and it can be in one of two states: disk mode (e.g., docked) or device mode (e.g., undocked). According to an embodiment, a mass storage device associated with a data processing device is divided into two or more segments or virtual volumes, and at least one volume is managed by the device even in a disk mode. In some cases, this makes the device usable while in the docked state and hence it improves the user experience. In some embodiments, an extra software component other than the file system is employed on the device to manage the storage device. Certain volumes may be dynamically increased or decreased while the data processing device is in a disk mode.

45 Claims, 26 Drawing Sheets

U.S. PATENT DOCUMENTS

| | | |
|---|---|---|
| 7,346,620 B2 | 3/2008 | Grubbs et al. |
| 7,395,389 B2 | 7/2008 | Kaplan et al. |
| 7,447,843 B2 | 11/2008 | Ishikawa et al. |
| 7,681,007 B2 | 3/2010 | Rustagi et al. |
| 7,761,284 B2 | 7/2010 | Matze et al. |
| 7,925,809 B2 * | 4/2011 | Reece .............................. 710/74 |
| 2003/0079038 A1 | 4/2003 | Robbin et al. |
| 2003/0167318 A1 | 9/2003 | Robbin et al. |
| 2004/0078542 A1 | 4/2004 | Fuller et al. |
| 2004/0177180 A1 | 9/2004 | Robbin et al. |
| 2004/0242269 A1 | 12/2004 | Fadell |
| 2005/0015355 A1 | 1/2005 | Heller et al. |
| 2005/0021880 A1 | 1/2005 | Robbin et al. |
| 2006/0100978 A1 | 5/2006 | Heller et al. |
| 2006/0155914 A1 | 7/2006 | Jobs et al. |
| 2006/0168351 A1 | 7/2006 | Ng et al. |
| 2006/0294323 A1 | 12/2006 | Armstrong et al. |
| 2007/0300033 A1 | 12/2007 | Kano |

* cited by examiner

SYSTEMS AND METHODS FOR STORAGE MANAGEMENT IN A DATA PROCESSING DEVICE

This application is a divisional of U.S. patent application Ser. No. 11/586,882 filed on Oct. 24, 2006 now U.S. Pat. No. 7,925,809.

BACKGROUND OF THE INVENTION

1. Field of the Invention

The present invention generally relates to data processing systems. More particularly, the present invention pertains to methods and systems for managing storage devices associated with data processing systems.

2. Description of the Related Art

Modern data processing systems such as personal computers are often used in association with other systems for various purposes. They are sometimes connected to a network such as a LAN (local area network) or a WAN (wide area network) such as the Internet, where many other data processing systems are connected. In some cases, a small number of data processing systems are also interconnected to each other, either directly or indirectly, often to achieve certain goals. Connected systems provide many benefits. For example, certain peripheral devices on one system can be shared with other systems that are connected to the system in some way. Other resources can also be shared among the data processing systems that are interconnected to each other.

Smaller data processing systems or devices such as personal digital assistants (PDA) or portable digital media players are often operated in connection with bigger or more powerful data processing systems such as personal computers for certain tasks. Portable data processing devices tend to have less computational power such as processing power or memory and less resource such as non-volatile storages. They also tend to have smaller display screens and smaller input panels, and hence they are generally less usable than their bigger counterparts. These data processing devices are sometimes connected to another data processing system, e.g., a host computer, to provide additional services to the host system. For example, a mass storage device of a laptop computer can be "mounted" to the host computer, thereby allowing the host to directly access the data on the laptop. Data processing devices are also operated in connection with host computers to enhance their functionalities and/or usabilities. For example, the devices that are not directly connected to a network may exchange or update data through a host system. Data such as personal information stored in a data processing device may be "synchronized" with the data in another data processing system by connecting, or "docking", the device to the system and performing an update operation. Many commercial PDAs come with the "sync" software. Digital media players, such as iPod of Apple Computer, Inc. of Cupertino, Calif., are also often used with a host computer to download and/or upload digital media content. For example, in the case of iPod and other portable music and video players, the iTunes software is used for this purpose. iTunes can also be used to sync the digital media list and other information including personal address books or calendars.

Many media players or other (portable or non-portable) data processing devices equipped with non-volatile memories such as hard disks or flash memories can be used as extra storage devices when they are docked to a host data processing system to expand the storage capacity of the host. This is accomplished, for example, by connecting or docking the portable device or computer to the host system such as a personal computer via a small computer system interface (SCSI) bus and placing the portable device into SCSI target mode. SCSI target mode is a mode in which a device accepts and implements SCSI commands, e.g., as if it was a peripheral device connected to the SCSI bus. The host system can typically access the storage device of the portable device as if it was locally connected, and, in particular, it can access the blocks of the storage device. This is often called SCSI target mode, or target disk mode (TDM) in the prior art. In the target disk mode, the docked device loses its autonomy and provides only the functions of transmitting SCSI commands between the host and the storage device.

This is illustrated in FIG. 1. In FIG. 1A, two different modes are shown in which a device might be operated in connection with a host. The device may be docked 104 in a host 110 and function as a storage device to the host, or it may be operated independently or autonomously 102. In this disclosure, the docked mode may be called a disk mode, to emphasize the resource sharing aspect of the docked state, and the undocked and autonomous state may be referred to as a device mode. The device and the host are relative terms, as used in this disclosure, and they do not indicate that one data processing system is inherently different from another data processing system. For example, as disclosed later, a laptop computer may act as a host whereas a desktop computer may be connected to the laptop in a disk mode. Typically, connecting a device to a host, as indicated by arrow 106, triggers the device to change its state to the disk mode 104. However, in some cases, explicit mode switching may be needed, either at a hardware level or at a software level. Likewise, disconnecting or undocking the device from the host, as indicated by arrow 108, typically changes the device's mode into the device mode 102. This is further illustrated in FIG. 1B as a flow chart. A device initially in an autonomous or device mode is connected to a host computer at 112. The connection then puts the device now in a disk mode, as indicated in a block 114. In this state, certain resources such as hard disks of the device may be shared with the host. At 116, the device is disconnected from the host. The device can be disconnected through a command in a user interface. Then, as indicated in block 118, the device is back in the autonomous operational state, that is, the device mode. As stated earlier, the mode switching between the two modes can be triggered either explicitly or implicitly.

In a SCSI emulation device, for example, the device or target system receives standard SCSI commands from the host, or the initiator system in the SCSI jargon, and emulates the SCSI device being accessed. The target device thereby provides a practical and economic system for achieving access to a multiplicity of peripherals in a SCSI environment. The initiator sends standard SCSI I/O device driver commands. The target system uses its own Basic Input/Output System (BIOS) and device drivers to access the non-local device and perform the initiator command. Thus, the initiator uses standard I/O device drivers for the given device and the target uses emulation code with redirection and/or translation routines to look like a standard SCSI device. The initiator system accesses the non-local devices on another computer as if it were local to their own computer. The user has the benefit of not needing to learn and remember additional commands to access devices on the other computers. In fact, the standard device drivers are typically used on the host system as if the peripheral units were integral with the basic system. As stated earlier, however, the target system loses its autonomy as a data processing system once it is put into a docked mode, or a disk mode. This is partly by design, for example, to maintain the integrity of the storage medium. When multiple systems, e.g., the host and the portable systems, have control over a storage device, the integrity of the data on the storage medium may not be guaranteed.

FIG. 2 illustrates a target system in an undocked state (or, a device mode) in a block diagram form. The initiator or the host system is not shown in the figure. The system as illustrated in the figure comprises, among other things, a main processing module 132 and a mass storage device 138. The mass storage device may be "internal" or "external" to the main or host device. The main module and the storage device are typically connected to each other, as indicated by the arrow in the figure, through a standard communication bus such as SCSI (small computer system interface), ATA or SATA or IDE (integrated drive electronic), USB (universal serial bus), or firewire (IEEE 1394). The device or system typically includes a file system 134 and a device driver 136. Device driver 136 is responsible for low-level communication between the main processing module 132 and peripheral devices such as the storage device 138. As schematically shown in the figure, the file system 134, which provides high-level service to the system or application level softwares, typically relies on the device driver 136 for low-level tasks. In cases of a block storage device, the device driver is often responsible for the block level management of the storage device.

This exemplary system is further illustrated in FIG. 3 as a block diagram. In particular, the system 154 corresponds to the system shown in FIG. 2. In the example of FIG. 3, the device 160 with a mass storage device 168 is currently docked to a host computer 152. That is, the system (or, "target device") is in a disk mode. In this mode, the mass storage device associated with the docked device may be managed by the host as stated earlier. The host data processing system 152 shown in the figure includes a file system software 156 and a device driver 158 as is typical of many such systems. The target device 154 is depicted with two separate units as in FIG. 2 for convenience: The peripheral device, namely the mass storage device 168 and the rest 160. As stated earlier, the mass storage device 168 of FIG. 3 may be internal or external and it is connected to the main processing system 160 through a communication bus. The system 160 again includes a file system 164 and a device driver 166, and the device driver 166 is responsible for the low-level communication with the mass storage device 168. The target system 154 also includes a special hardware or software 162 responsible for communicating with a host or initiator computer, the host 152 in the figure. In some cases, the unit 162 includes a communication port ("C.P.") and/or a control program ("C.P."). When the target device 154 is docked to the host 152, the host computer may access the data in the mass storage 168 through the connection on the communication port 162. As illustrated in the figure, the host system does this through a device driver 158 as if the mass storage device were connected locally. As stated earlier, once the target device 154 is in a disk mode and the host system 152 has access to the mass storage 168, the target device loses autonomy, This is partly to protect the data integrity of the storage. In many applications involving this type of setup, the target device is generally simple data processing systems and they typically use DOS FAT (disk operating system file allocation table) file system. The FAT file system lacks sophistication to allow multiple system access. Therefore, in a typical system setup, once the target system is in a disk mode, it only relays the data access command from the host to the mass storage. For example, a file access command initiated by an application on the host computer 152 may be relayed through the host's file system 156, the device driver 158, and the control program 162, the target system's device driver 166, and finally to the target's mass storage device 168. The response from the storage device may be returned in the opposite way.

This is schematically illustrated in FIG. 4A as a simple sequence diagram. The diagram includes three actors, Host Computer 182, Target System 184, and Mass Storage 186, which is coupled to the target system 184, either directly or indirectly. The target system or device 184 is docked to the host computer 184. As illustrated in the diagram, the host first sends the data access command to the target device, at 188. The command is then relayed, either with or without modification, to the storage device 186, as indicated by the arrow 190. Next, the processed data is returned to the target device, at 192, which is in turn relayed to the host as indicated by the arrow 194. As illustrated in this simplified process, in the disk mode, the target device loses its autonomy and only plays the role of virtual device driver or communication link.

This is further illustrated in FIG. 4B as a flow chart. The chart illustrates an exemplary process similar to the one shown in the sequence diagram of FIG. 4A. In the exemplary process shown in FIG. 4B, a host computer accesses data in a storage device through a data processing system (or, "target device") managing the storage device. The process begins by connecting or docking a target device to a host computer, at 212. The target device includes a hard disk. Once it is connected to the host, it enters the disk mode (or, target mode or target disk mode) as indicated in block 214. As stated early, mode switching may require explicit operations in some cases. The host computer then sends a data access request, at 216. The data access request might include requests for reading data from certain blocks of the storage device or for writing data to certain blocks. The target device relays the request to the hard disk, at 218. Once the request is fulfilled by the hard disk, at 220, the response such as the requested blocks of data is returned to the host computer through the target device as indicated in block 222.

As stated in the beginning, data processing systems may be alternatively connected to each other through networks such as a local area network (LAN) instead of being connected directly. This solution poses a number of difficulties for the user, however. A LAN approach requires significant hardware and software investment and necessitates extensive system overhead. A network requires one network adapter per computer. An abundance of software is needed to implement the communication protocol and handle device sharing. In some cases, for example, special types of file systems need to be used for the hard disk to be shared. Furthermore, Local Area Networks require the user to learn a new menu of commands. This is extra work for the end user and often adds significant delay in accessing the peripherals. Therefore, a LAN approach is generally suitable for wide-scale resource sharing such as in network storage systems.

FIG. 5A illustrates one such method called NAS (network attached storage) in the prior art. Two data processing systems 242 and 244 are connected through a network such as LAN, as indicated by arrow 260 in the figure. The computer B, 244, manages a mass storage device 258, through a file system 254 and a device driver 256. The computer A, 242, also has a file system and 248 and a device driver 250, and it may have local storage devices of its own (not shown in the figure). Both computers have network interfaces 246 and 252 for communication and other network related infrastructures, e.g., hardwares and/or softwares (not explicitly shown in the figure). The computer A 242 accesses the data in the mass storage device 258 through the computer B 244. The computer B "translates" data access request from the computer A and acts as a proxy. The response from the mass storage device is similarly translated and returned to the computer A through the network 260. This is further illustrated in FIG. 5B, which shows an exemplary process of managing and accessing (e.g., reading/writing) data on a mass storage device from a remote host as a flow diagram. The process begins by connecting two computers through a network, at 272. One of the computers has a storage device that can be shared. The "remote" computer then sends a data access request through the network, at 274. The data access request may be a request to write a file on the storage device. In network attached storage systems, the data access is typically done at a file level. Next, the "local" computer processes the file access request, at 276 and 278, and sends the response including the requested data, if any, back to the first computer, as indicated in blocks 280 and 282.

FIG. 6A shows another prior art system called storage area network (SAN) in a block diagram form. A mass storage device 320 is shared by multiple computers connected on the network (indicated by arrows in the figure). The diagram shows two computers, 302 and 304, each of which is equipped with file systems, 308 and 314, and device drivers, 310 and 316, respectively. The support for networking is also schematically illustrated by network interfaces 306 and 312 in the figure. In a storage area network system, the data at the mass storage device can be accessed at a block level, and therefore it typically includes a special system to coordinate data access by multiple computers. This is indicated in the figure as a lock manager 318. The data access from a computer on the network, such as 302 or 304, involves locking of necessary blocks in the mass storage 320 to maintain the integrity of the data in the storage system. FIG. 6B illustrates this as a flow diagram. At block 342, a computer A sends a request to access a certain block on a shared storage device. This prompts a lock manager to lock the pertinent blocks, at 344, so that the block cannot be concurrently accessed by another system. Once the request is completed, at 346, the lock manager unlocks the blocks, at 348, and other systems on the network can access, e.g., read or write, data on the blocks.

Another relevant system called logical volume management (LVM) is shown in FIG. 7A. The figure shows two storage devices 392 and 394. Each storage device may have one or more partitions. In a logical volume management system, storage devices are typically managed at a partition level. In this scheme, one or more partitions in block storage devices are grouped into logical volumes, as indicated by a block 390 in the figure. A host system 382, which has a file system 384 and a device driver 388, then accesses the data in the storage systems 392 and 394 through this virtual layer 390. In some implementations, a special purpose program 386, typically called logical volume manager, provides certain necessary functions. In the figure, the LVM 386 is drawn between the file system 384 and the device driver 388. FIG. 7B depicts an exemplary process of logical volume management. In particular, it illustrates a process for automatically resizing a volume. The exemplary process starts from a file system initiating a file write request to a particular logical volume, at 422. The exemplary scenario then assumes that the particular logical volume does not have enough free space to fulfill the request, as indicated in block 424. In such a case, the logical volume manager increases the volume size, at 426. This is typically accomplished without changing the low-level partitions with the help of the additional logical volume layer built on top of the device level partitions. Then the request is honored, at 428, and the response is returned to the host's file system, at 430.

BRIEF SUMMARY OF THE DESCRIPTION

The present invention provides improved methods and systems for storage management in a data processing device.

Embodiments of the present invention may be used for increasing the speed and resource utilization of a computer system in which a first computer uses a second computer as an extra hard disk. The system and method comprises a first computer coupled to a second computer including a hard disk, and the second computer can be in one of the two states: a disk mode (e.g., docked) or a device mode (e.g., undocked). When in docked state, the second computer functions for storing data from the first computer into the hard disk and for transferring requested data from the hard disk to the first computer. According to an embodiment, the hard disk associated with the second computer is divided into two or more segments or virtual volumes, and at least one volume is managed by the second computer even in a disk mode. In some cases, this makes the second computer usable while in the docked state and hence it improves the user experience. In certain embodiments, an extra software component other than the file system is employed on the second computer to manage the storage device. In some embodiments, data in the hard disk can be accessed at a block level as well as a file level. Certain volumes may be dynamically increased or decreased while the second computer or device is in a disk mode.

According to an embodiment of the present invention, a data processing device or system is provided which includes a mass storage device and a communication interface. The mass storage device comprises a first segment of data area and a second segment of data area. The first segment of data area is accessible when the data processing device is in a disk mode and both the first and second segments of data area are accessible when the data processing device is in a device mode. The communication interface is used for receiving commands from another system when the data processing device is in the disk mode. The second segment of data area is accessible to another system through the communication interface when the data processing device is in the disk mode.

According to an embodiment of the present invention, a method is provided for use with a data processing device having a mass storage device, which comprises a first segment of data area and a second segment of data area. The method comprises: a) switching modes to a first operational mode when the data processing device is connected to another data processing system and switching modes to a second operational mode when the data processing device is disconnected from the data processing system; b) the data processing device has access to the first segment of data area and the data processing system has access to the first segment of data area and the second segment of data area when the data processing device is in the first operational mode, and the second segment of data area is not accessible to the data processing device when in the first operational mode; and c) the data processing device has access to the first segment of data area and the second segment of data area when the data processing device is in the second operational mode, and the data processing device is capable of autonomous processing of data when in the second operational mode.

According to an embodiment of the present invention, a method is provided which may be used with a data processing system coupled to another data processing device having a mass storage device. The data processing device is capable of autonomous processing of data and the mass storage device comprises a first segment of data area and a second segment of data area. The method comprises: connecting to the data processing device, where the data processing device has access to the first segment of data area when the data processing device is connected to the data processing system and the data processing system has access to the second segment of data area when the data processing device is connected to the data processing system, and the second segment of data area is not accessible to the data processing device when the data processing device is connected to the data processing system.

According to an embodiment of the present invention, a method is provided for a storage device of a data processing device having a communication interface through which another system is given access to the storage device. The method comprises: a) vending a first portion of the storage device to the another system while the data processing device is in a disk mode; b) retaining control, by the data processing device, over a second portion of the storage device while in the disk mode, in which locking of blocks in the second portion, from access by the another system, is performed at a block level; and c) expanding a size of the second portion by taking part of the first portion while in the disk mode.

According to an embodiment of the present invention, a method is provided in which a data processing system accesses a non-local storage device. The storage device is coupled to another data processing system and the two data processing systems are connected to each other through a communication bus. The method comprises: a) accessing a first portion of the storage device while the second data processing system is in a disk mode; b) giving control to the second data processing system over a second portion of the storage device when second data processing system is in the disk mode, where blocks in the second portion are locked at a block level, by the second data processing system, from access by the first data processing system; and c) expanding a size of the second portion by sending at least one command to the second data processing system through the communication bus, in which the aforementioned expanding is performed by the second data processing system by taking part of the first portion while in the disk mode.

According to an embodiment of the present invention, a method is provided for use with a data processing device. The method comprises: a) having a mass storage device, the mass storage device comprising a first segment of data area and a second segment of data area; b) having means to switch modes between at least a disk mode and a device mode; c) the data processing device has access to the first segment of data area when the data processing device is in the disk mode and the data processing device has access to both first and second segments of data area when the data processing device is in the device mode, and the data processing device is capable of autonomous processing of data when in device mode; d) switching modes to the disk mode when the data processing device is connected to a data processing system; and e) the data processing system has access to the second segment of data area when the data processing device is in the disk mode, and the second segment of data area is not accessible to the data processing device when in the disk mode.

According to an embodiment of the present invention, a method is provided for use with a mass storage device having a storage area. The method comprises: a) dividing a storage area into at least a first segment of data area and a second segment of data area; b) connecting the mass storage device to a data processing device, the data processing device being in one of a disk mode and a device mode; c) the data processing device has access to the first segment of data area when the data processing device is in the disk mode; and d) the data processing device has access to the first and second segments of data area when the data processing device is in the device mode, the second segment of data area is accessible to another system through a communication interface of the data processing device when the data processing device is in the disk mode, and the data processing device is capable of autonomous processing of data when in the device mode. Furthermore, the second segment of data area is not accessible to the data processing device when in the disk mode. In some embodiments, the method further comprises: performing at least one data access operation in response to a command from the data processing device.

According to an embodiment of the present invention, a method is provided for use with a data processing system. The method comprises: a) connecting the data processing system to a data processing device having a mass storage device, the mass storage device comprising a first segment of data area and a second segment of data area, where the data processing device has access to the first segment of data area when the data processing device is connected to the data processing system and the data processing system has access to data in the mass storage device when the data processing device is connected to the data processing system; b) having first program means of communicating with the data processing device, where the first program means has access to data in the mass storage device; c) having second program means of communicating with the data processing device, where the second program means has access to data in the second segment of data area; and d) sending a request to the data processing device to increase a size of the first segment of data area.

According to an embodiment of the present invention, a method is provided for use with a data processing device. The data processing device includes a mass storage device, which comprises a first segment of data area and a second segment of data area. The method comprises: a) switching modes to a disk mode when the data processing device is connected to a data processing system, in which data processing system has access to data in the mass storage device when the data processing device is in the disk mode; and b) increasing a size of the first segment of data area while the data processing device is in the disk mode.

According to an embodiment of the present invention, a method is provided for use with a data processing device. The data processing device includes a mass storage device, which comprises a first segment of data area and a second segment of data area. The method comprises: a) switching modes to a device mode when the data processing device is disconnected from a data processing system, wherein the data processing device has access to the first and second segments of data area when the data processing device is in the device mode; and b) consolidating blocks in the first segment of data area by moving at least one block in the mass storage device so that the blocks in the first segment of data area are substantially contiguous to each other while the data processing device is in the device mode.

According to an embodiment of the present invention, an apparatus for data processing is provided. The apparatus comprises: a) a data processing device, the data processing device having a first operational mode and a second operational mode, where the data processing device is capable of autonomous processing of data when in the second operational mode; b) a storage device coupled with the data processing device, wherein the storage device comprises a first segment of data area and a second segment of data area; c) means to switch modes of the data processing device between the first operational mode and the second operational mode, wherein the data processing device has access to the first segment of data area when the data processing device is in the first operational mode and wherein the data processing device has access to both first and second segments of data area when the data processing device is in the second operational mode; and d) program means for controlling data access to the storage device in response to at least one command given to the data processing device when the data processing device is in the first operational mode, and wherein the second segment of data area is not accessible to the data processing device when in the first operational mode.

Therefore, as summarized herein, the present invention provides, among other things, methods and systems for local and non-local storage management in a data processing device. These and other embodiments, features, aspects, and advantages of the present invention will be apparent from the accompanying drawings and from the detailed description and appended claims which follow.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1A:
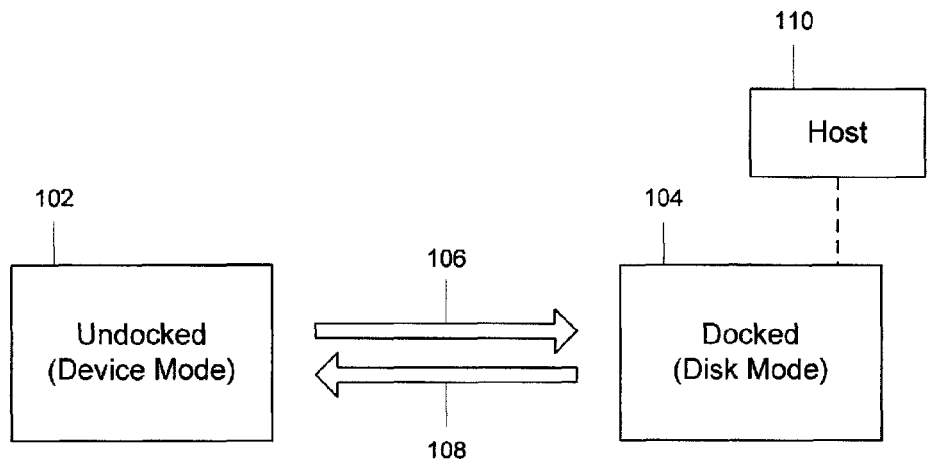
FIG. 1A shows two different modes in which a device might be operated in connection with a host. The device may be docked in a host and function as a storage device to the host, or it may be operated independently.
Figure 1B:
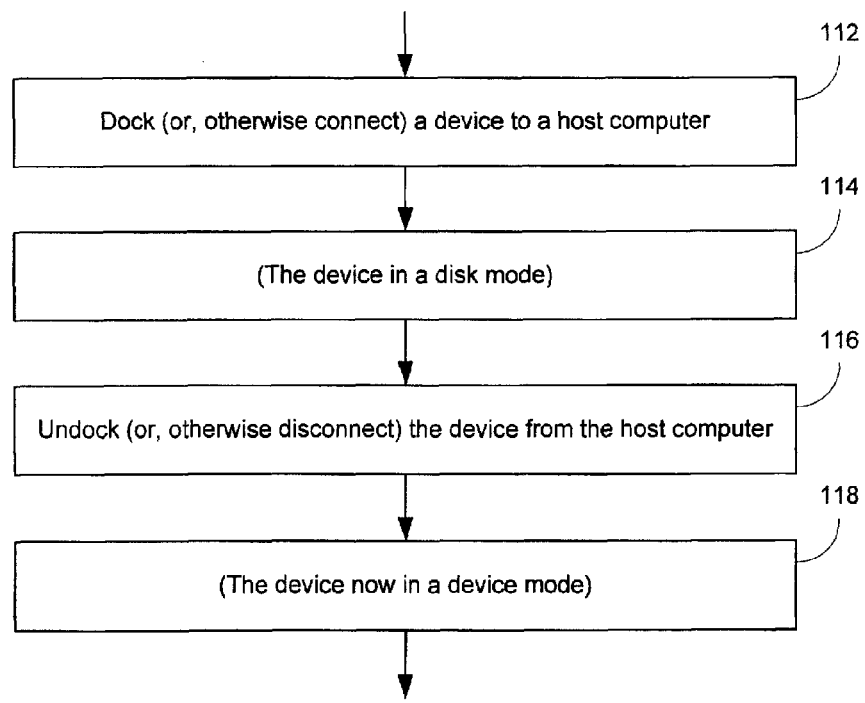
FIG. 1B illustrates an exemplary scenario in which a device is operated in two different modes. The device can be switched between the two modes either explicitly or implicitly.
Figure 2:
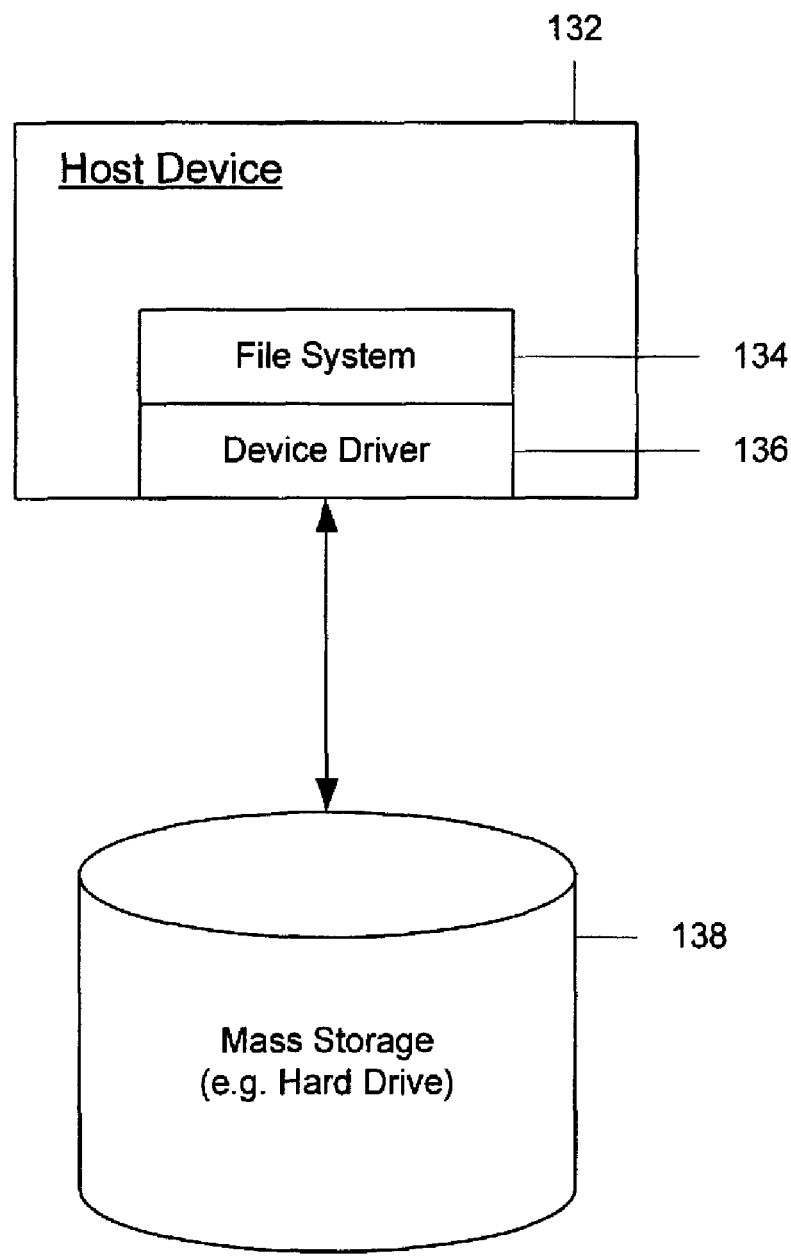
FIG. 2 is a block diagram illustrating a device in an undocked state (or, a device mode). The diagram illustrates, among other things, a device and a mass storage device connected to the device.
Figure 3:
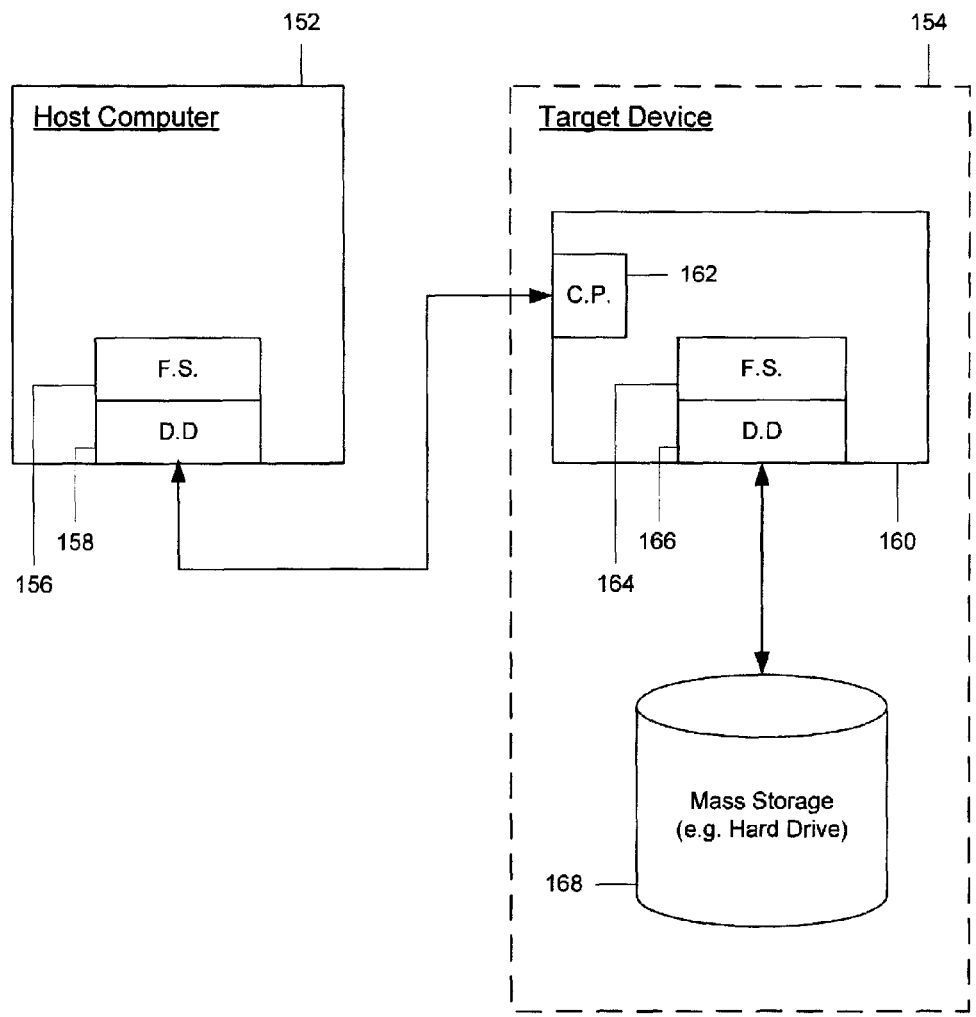
FIG. 3 is a block diagram illustrating a device currently docked to a host (or, a disk mode). In this mode, the mass storage device associated with the docked device is managed by the host.
Figure 4A:
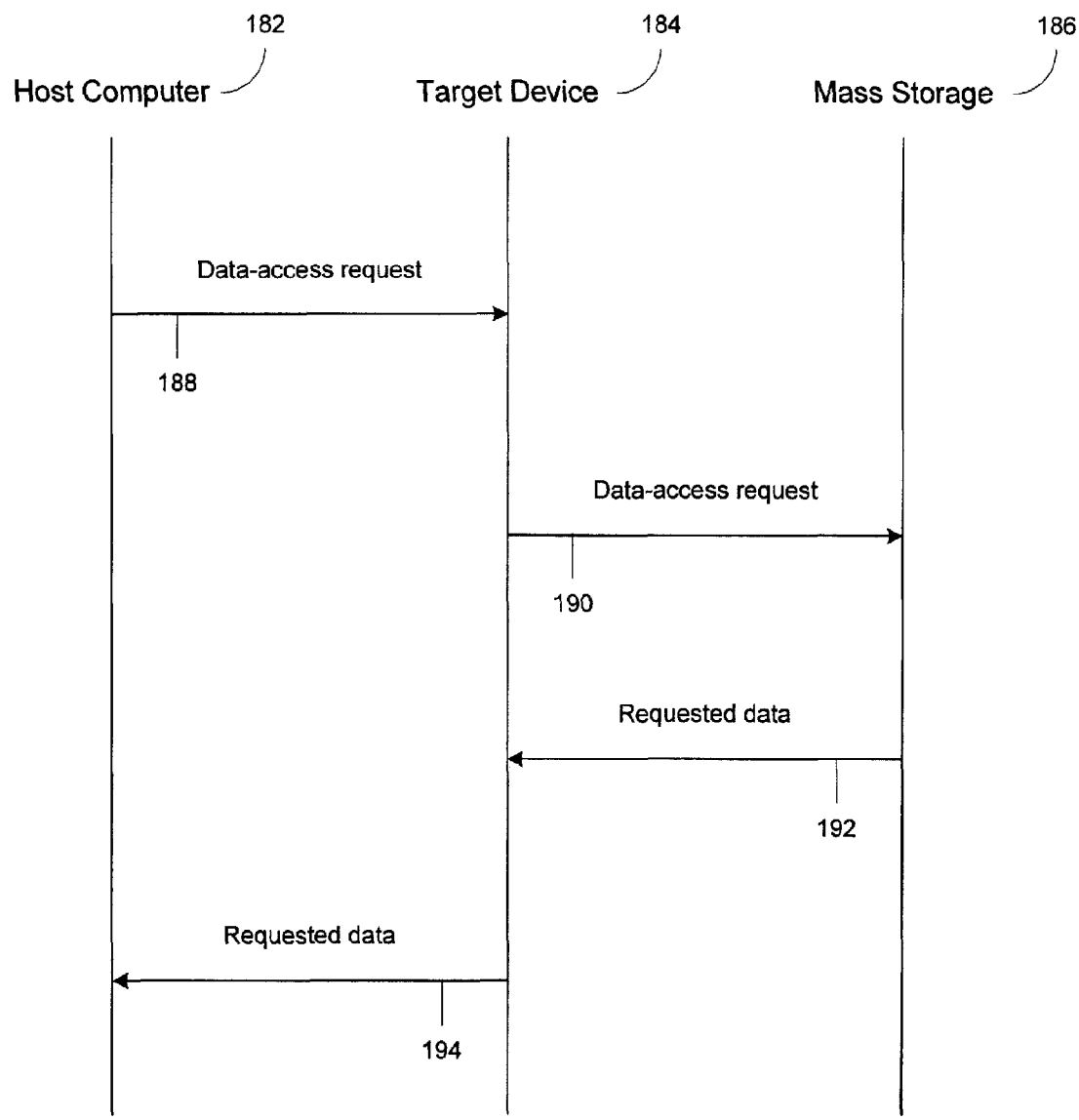
FIG. 4A is a sequence diagram showing an exemplary process for a device docked in a host. Host-initiated read/write operations are illustrated in the diagram.
Figure 4B:
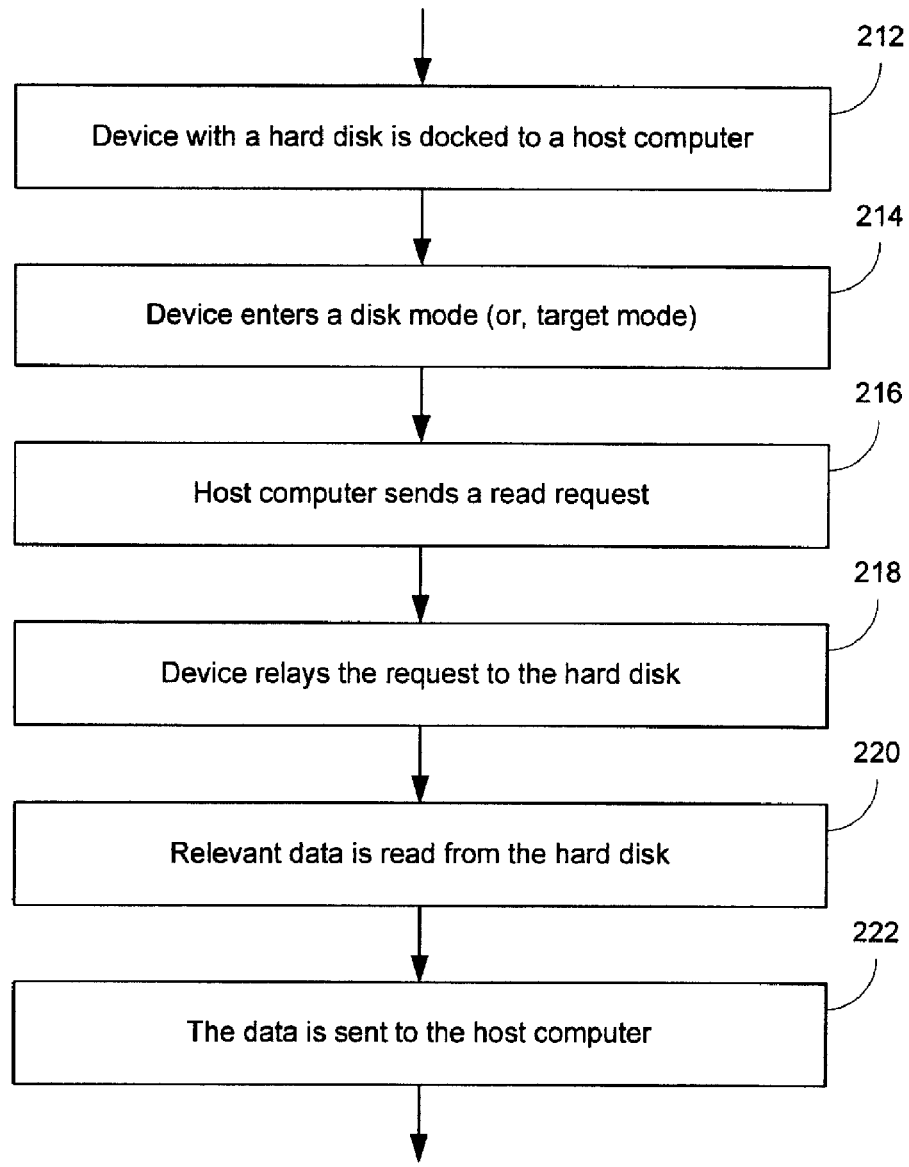
FIG. 4B depicts a flow diagram illustrating an exemplary process in which a host computer accesses data in a storage device through a data processing device managing the storage device.
Figure 5A:
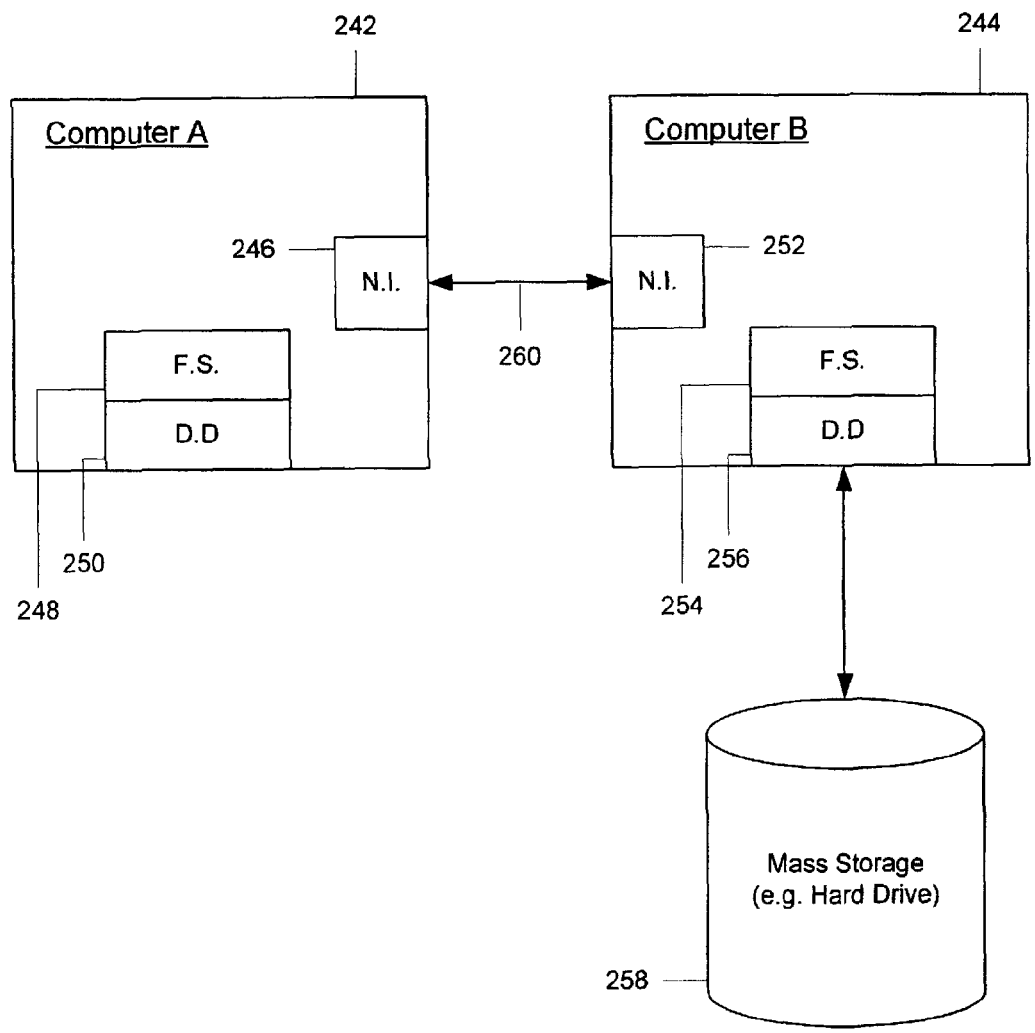
FIG. 5A illustrates a mass storage device (of a local host) connected to a remote host over a network in a prior art. Both the local host and the remote host can access and manage the storage device.
Figure 5B:
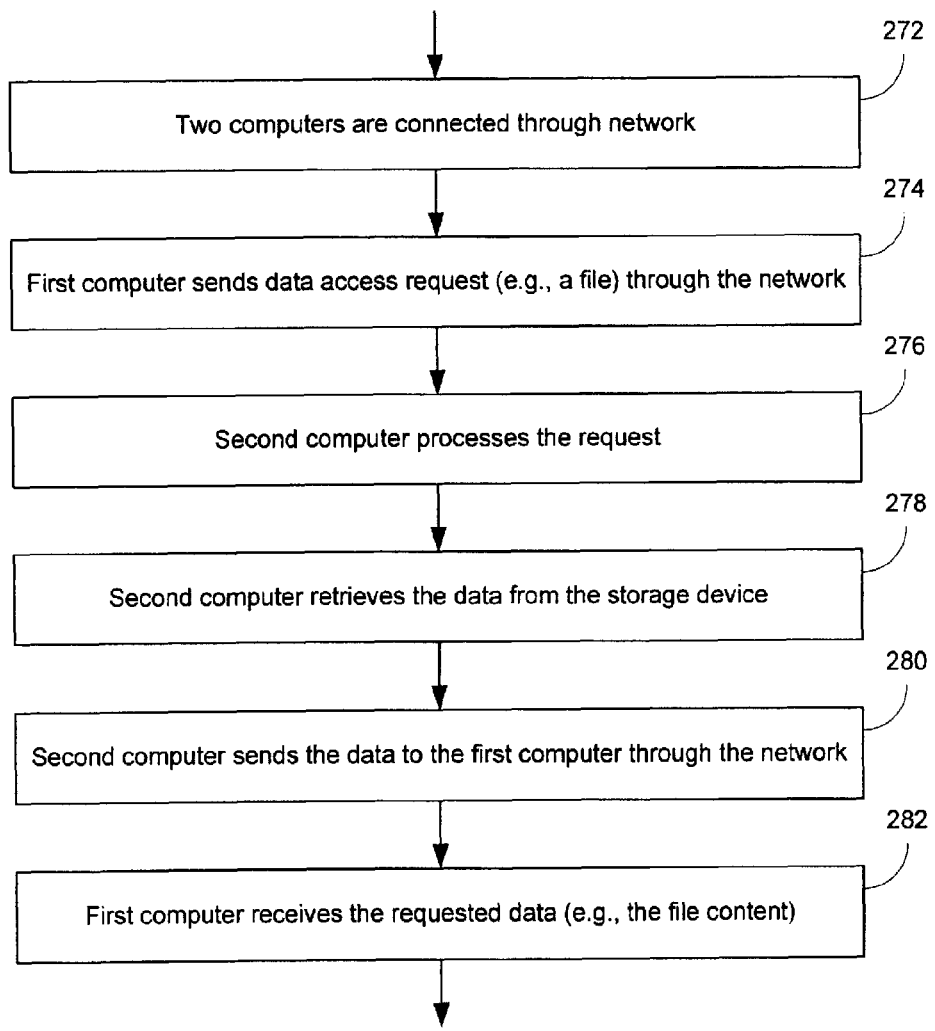
FIG. 5B is a flow diagram for an exemplary process of managing and accessing (e.g., reading/writing) data on a mass storage device from a remote host.
Figure 6A:
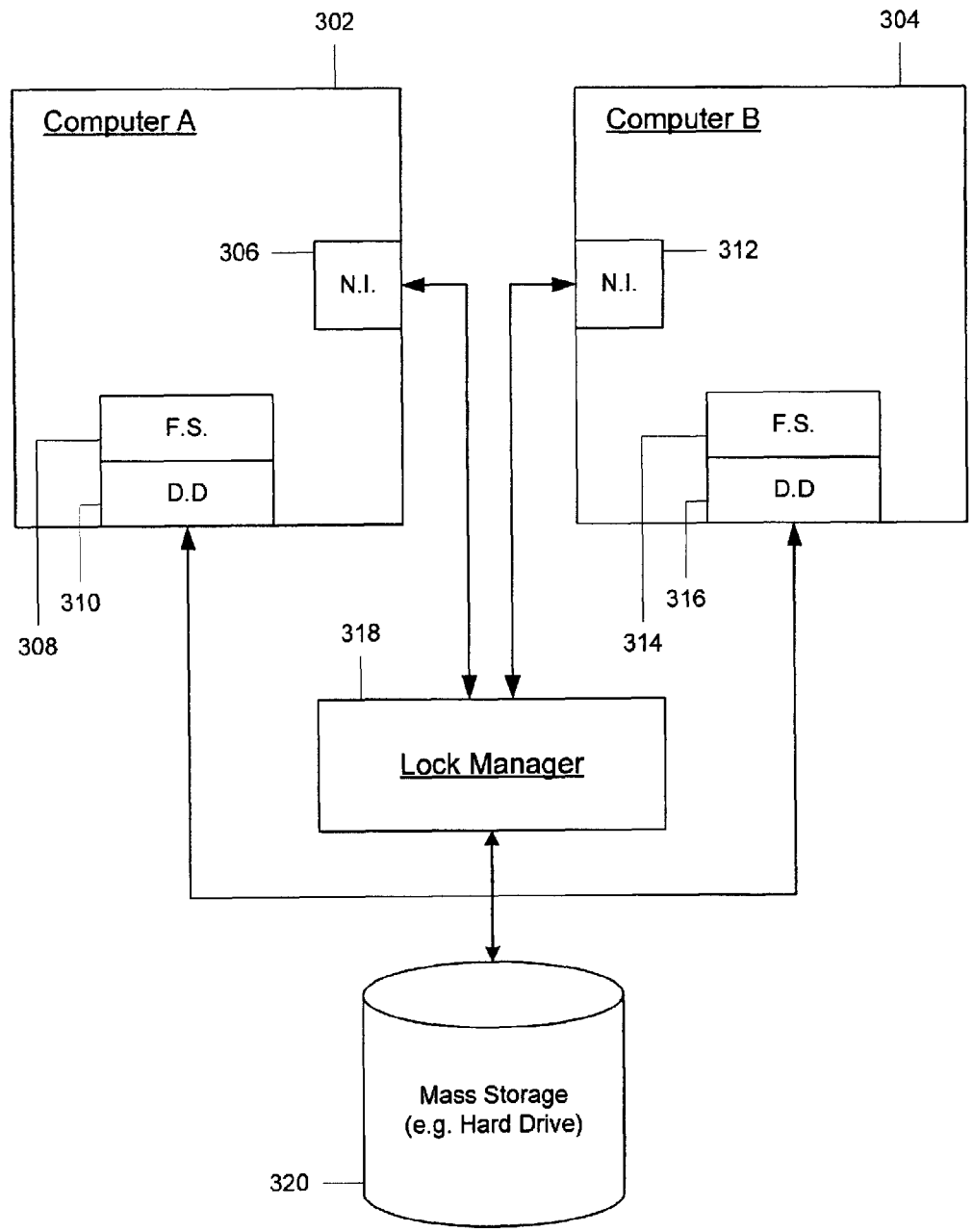
FIG. 6A shows a prior art in block diagram. It illustrates a mass storage device in storage area network. The storage device can be accessed by multiple hosts on the network.
Figure 6B:
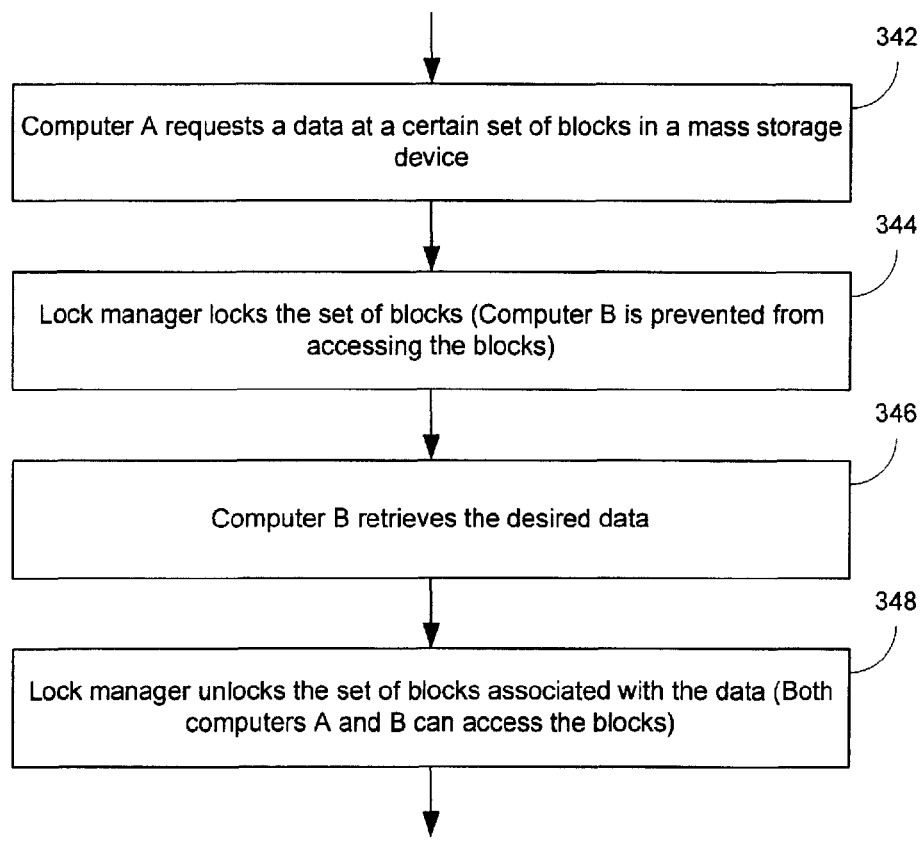
FIG. 6B is a flow diagram illustrating an exemplary process of managing a mass storage device in storage area network.
Figure 7A:
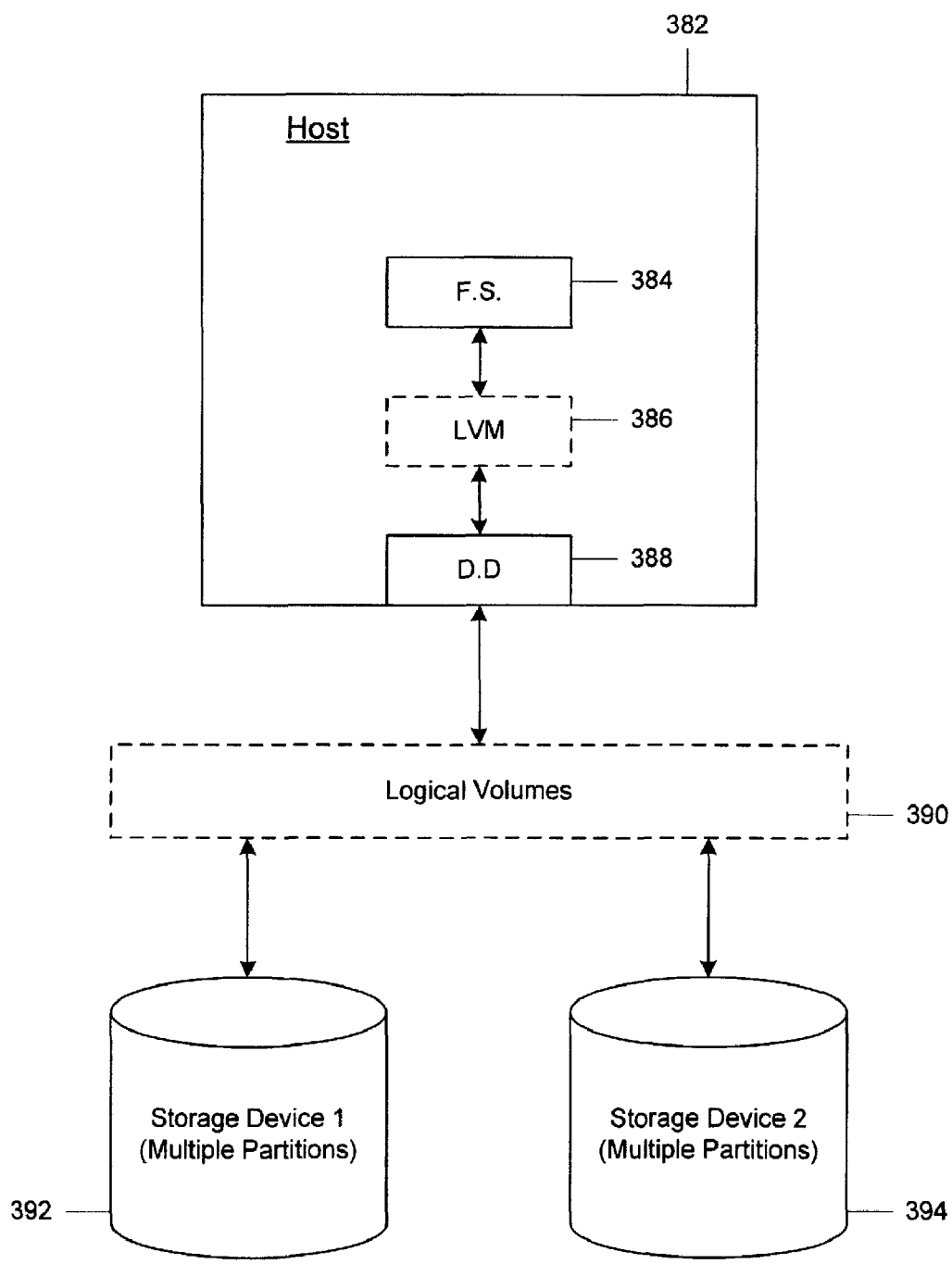
FIG. 7A shows a prior art known as logical volume management. One or more partitions in block storage devices are grouped into logical volumes.
Figure 7B:
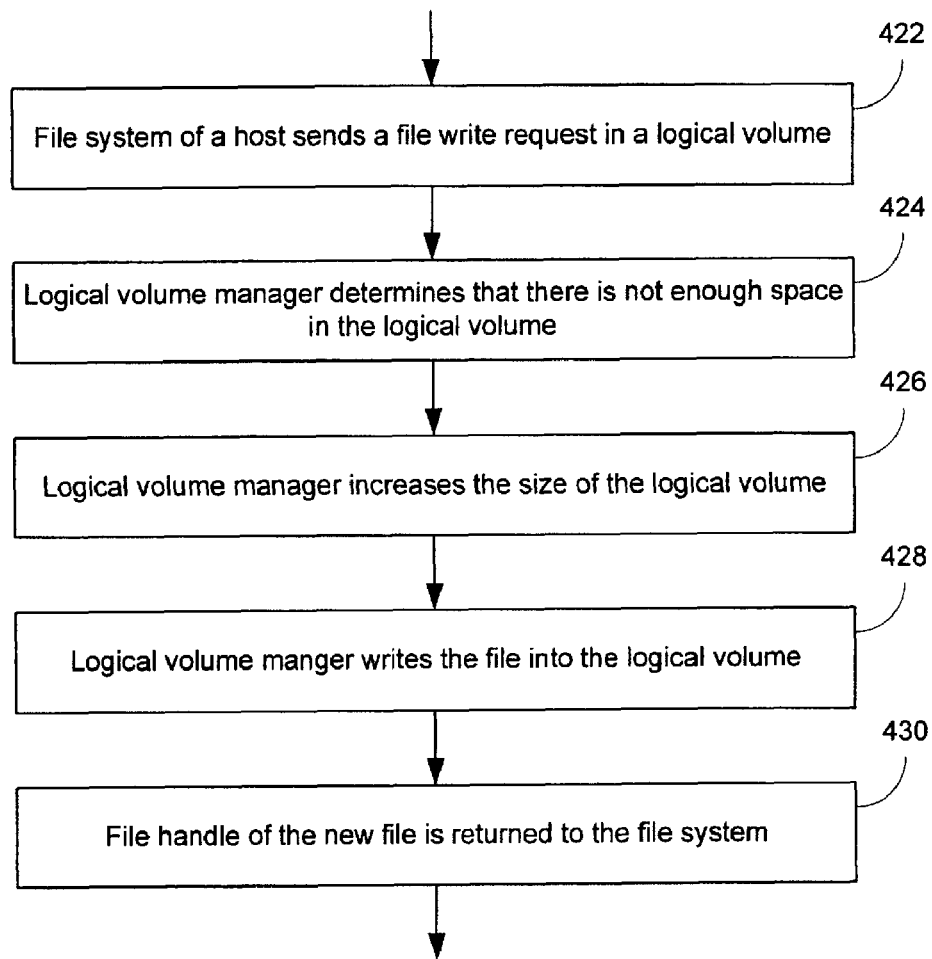
FIG. 7B depicts an exemplary process of logical volume management. In particular, it illustrates a process for resizing a volume.

The present invention will now be described more fully hereinafter with reference to the accompanying drawings, in which various exemplary embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Likewise, for purposes of explanation, numerous specific details are set forth in the following description in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Parts of the description may be presented using terminology commonly employed by those skilled in the art to convey the substance of their work to others skilled in the art. Also, parts of the description may be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

The invention may utilize a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks, enterprise-wide computer networks, and the global Internet.

In addition, it should be understood that the programs, processes, methods, etc. described herein are not related to any particular computer or apparatus nor are they related or limited to any particular communication network architecture. Rather, various types of general-purpose machines may be used with program modules constructed in accordance with the teachings described herein. Similarly, it may prove advantageous to construct a specialized apparatus to perform the method operations described herein by way of dedicated computer systems in a specific network architecture with hard-wired logic or programs stored in nonvolatile memory such as ROM (read only memory).

Various methods will be described as multiple discrete operations in turn in a manner that is most helpful in understanding embodiments of the present invention. However, the order of the description should not be construed as to imply that these operations are necessarily to be performed in any particular order, in particular, in the order of the presentation.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Figure 8:
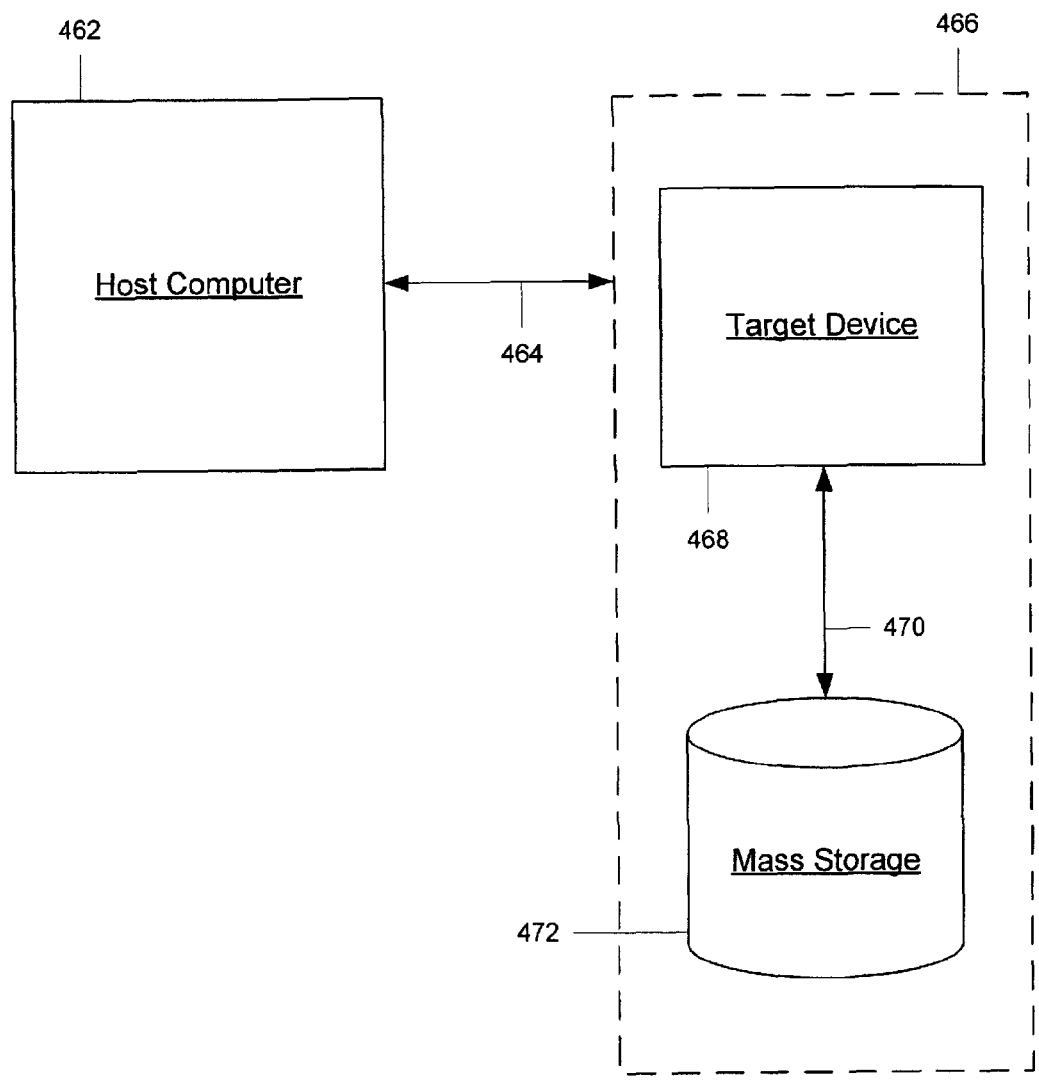
FIG. 8 is a block diagram illustrating various hardware components in an embodiment of the present invention. The figure shows, among other things, a host, a device connected to the host, and a mass storage device associated with the device.

Referring back to FIG. 1A, two different modes are shown in which one data processing system ("a device") might be operated in connection with another data processing system ("a host"). The device may be docked 104 in a host 110 and function as a storage device to the host, or it may be operated independently 102. As stated earlier, the docked mode may be called a disk mode in this disclosure, to emphasize the resource sharing aspect of the docked state, and the undocked and autonomous state may be referred to as a device mode. The device and the host are relative terms and they do not indicate that one data processing system is inherently different from another data processing system. Typically, connecting a device to a host, as indicated by arrow 106, triggers the device to change its state to the disk mode 104. However, in some cases, explicit mode switching may be needed. Likewise, disconnecting or undocking the device from the host, as indicated by arrow 108, typically changes the device's mode into the device mode 102. This relationship is further illustrated in FIG. 8 as a block diagram. The diagram shows a "host" system 462 and a "target" system 466. As indicated earlier, the word target is borrowed from the SCSI (small computer system interface) terminology, but embodiments of the present invention are not limited to SCSI technology in any way. The two systems are connected through a communication bus, as indicated by an arrow 464, such as SCSI (small computer system interface), ATA (Advanced Technology Attachment) or SATA (Serial Advanced Technology Attachment), USB (universal serial bus), or firewire (IEEE 1394) or other interface. Wired or wireless connection may be employed. The interface may use, for example, SCSI commands over a USB interface, or other commands over other interfaces. The target system is divided into two parts for convenience of illustration, a mass storage device 472 and the rest, 468, the latter of which includes main processing units and memory and the user interface and so forth. The mass storage unit 472 is connected to the main system 468 through a bus 470 such as SCSI, ATA, SATA, IDE, USB, or firewire or other interfaces (wired or wireless). The figure shows the target device 468 and mass storage 472 as separate entities.

However, the term target device may also be used, throughout this disclosure, to refer to a data processing system including a mass storage device.

Figure 9:
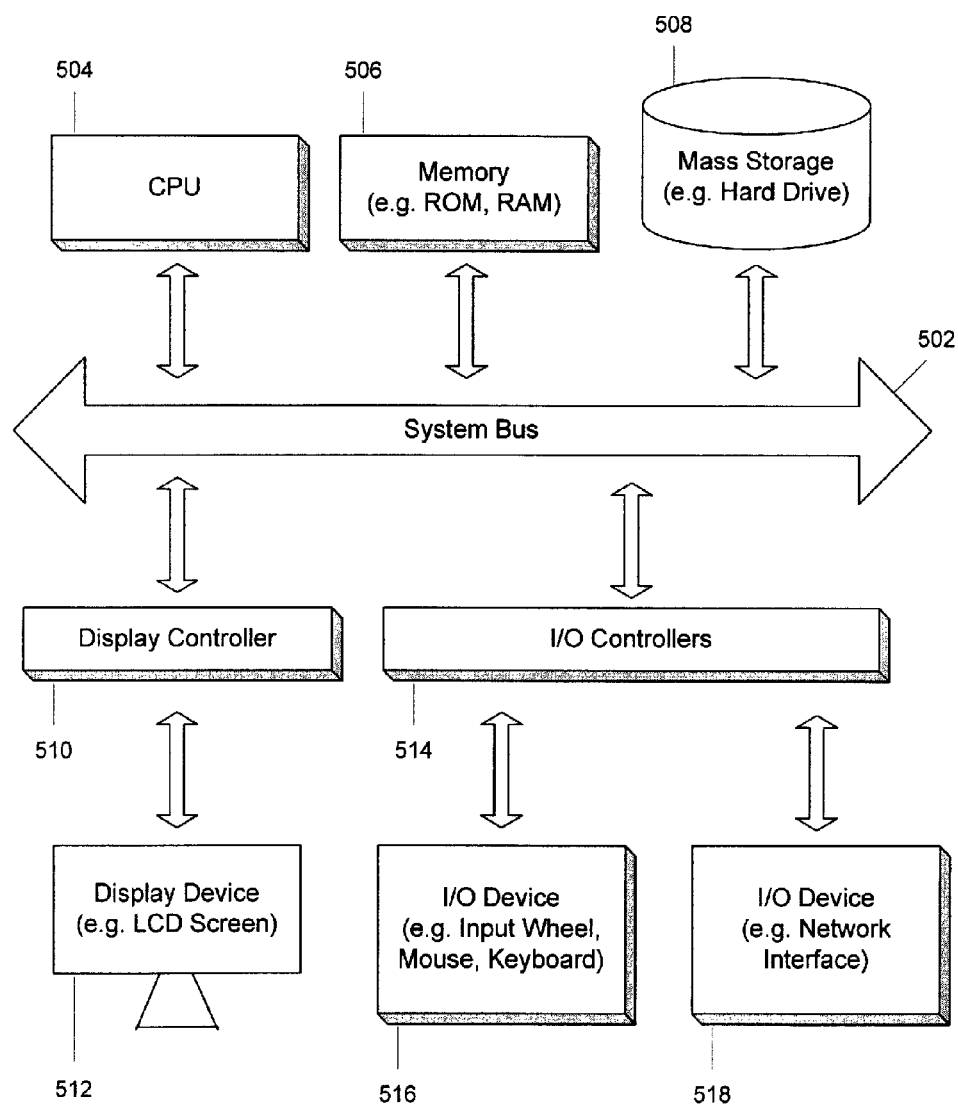
FIG. 9 shows a block diagram illustrating various components of an exemplary data processing system, with which embodiments of the present invention can be practiced

FIG. 9 shows a block diagram illustrating various components of an exemplary data processing system. This and other data processing systems may be used with various embodiments of the present invention. As will be appreciated by one of skill in the art, however, the present invention may be embodied as a method, data processing system or program product as well as an article of manufacture or an apparatus. Thus the scope of the invention should be determined by the appended claims and their legal equivalents, and not by the examples given. Note that while the block diagram of FIG. 9 illustrates various components of a data processing system, it is not intended to represent any particular architecture or manner of interconnecting the components. It will also be appreciated that personal computers, laptops, and network computers, and other data processing systems such as cellular telephones, personal digital assistants, music players, etc. which have fewer components or perhaps more components may also be used with the present invention. The computer system of FIG. 9 may, for example, be an iPod® portable digital media player system or Macintosh® personal computer from Apple Computer, Inc. of Cupertino, Calif.

As shown in FIG. 9, the exemplary data processing system includes a bus 502 which is coupled to a microprocessor(s) 504 and a memory 506 such as a ROM (read only memory) or a volatile RAM and a non-volatile storage device(s) 508. The system bus 502 interconnects these various components together and also interconnects these components 504, 506, and 508 to a display controller(s) 510 and display devices 512 such as LCD screens and to peripheral devices such as input/output (I/O) devices 516 and 518 which may be mice, keypads, input wheels, modems, network interfaces, printers and other devices which are well known in the art. Typically, the I/O devices 516 and 518 are coupled to the system through I/O controllers 514. The volatile RAM (random access memory) 506 is typically implemented as dynamic RAM (DRAM) which requires power continually in order to refresh or maintain the data in the memory. The mass storage 508 is typically a magnetic hard drive or a magnetic optical drive or a re-writeable optical drive or a DVD ROM or solid state storage (e.g. flash memory) or other types of memory systems which maintain data (e.g. large amounts of data) even after power is removed from the system. Typically, the mass storage 508 will also be a random access memory although this is not required. While FIG. 9 shows that the mass storage 508 is a local device coupled directly to the rest of the components in the data processing system, it will be appreciated that the present invention may utilize a non-volatile memory which is remote from the system, such as a network storage device which is coupled to the data processing system through a network interface 518 such as a modem or Ethernet interface. The bus 502 may include one or more buses connected to each other through various bridges, controllers and/or adapters as is well known in the art. In one embodiment, the I/O controller 514 includes a USB (universal serial bus) adapter for controlling USB peripherals and an IEEE 1394 (firewire) controller for IEEE 1394 compliant peripherals. The display controllers 510 may include additional processors such as GPUs (graphical processing units) and they may control one or more display devices 512.

Figure 10:
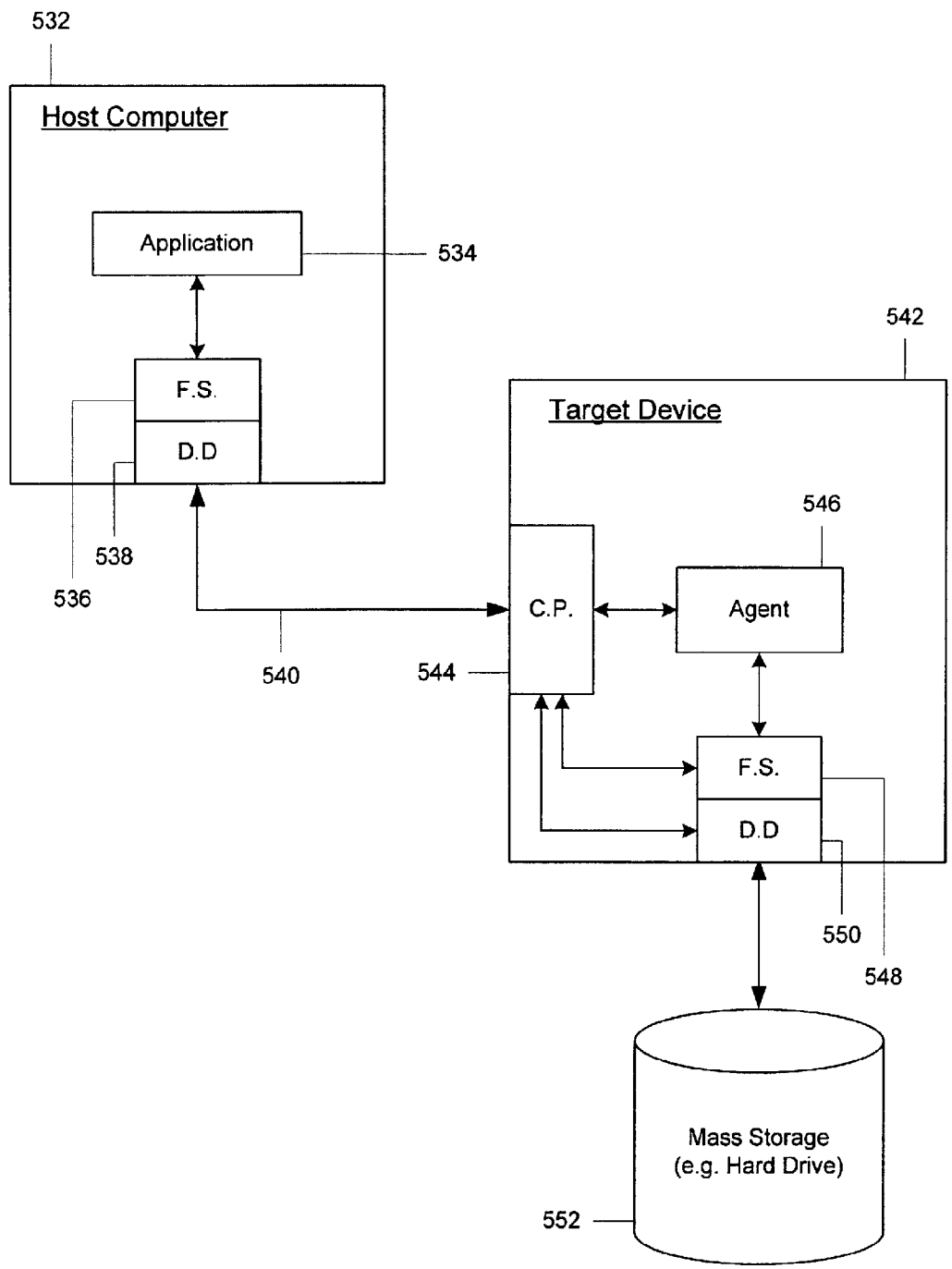
FIG. 10 depicts various components and modules according to an embodiment of the present invention in a block diagram form. The diagram includes a host and a device connected, for example, through a serial bus.
Figure 11:
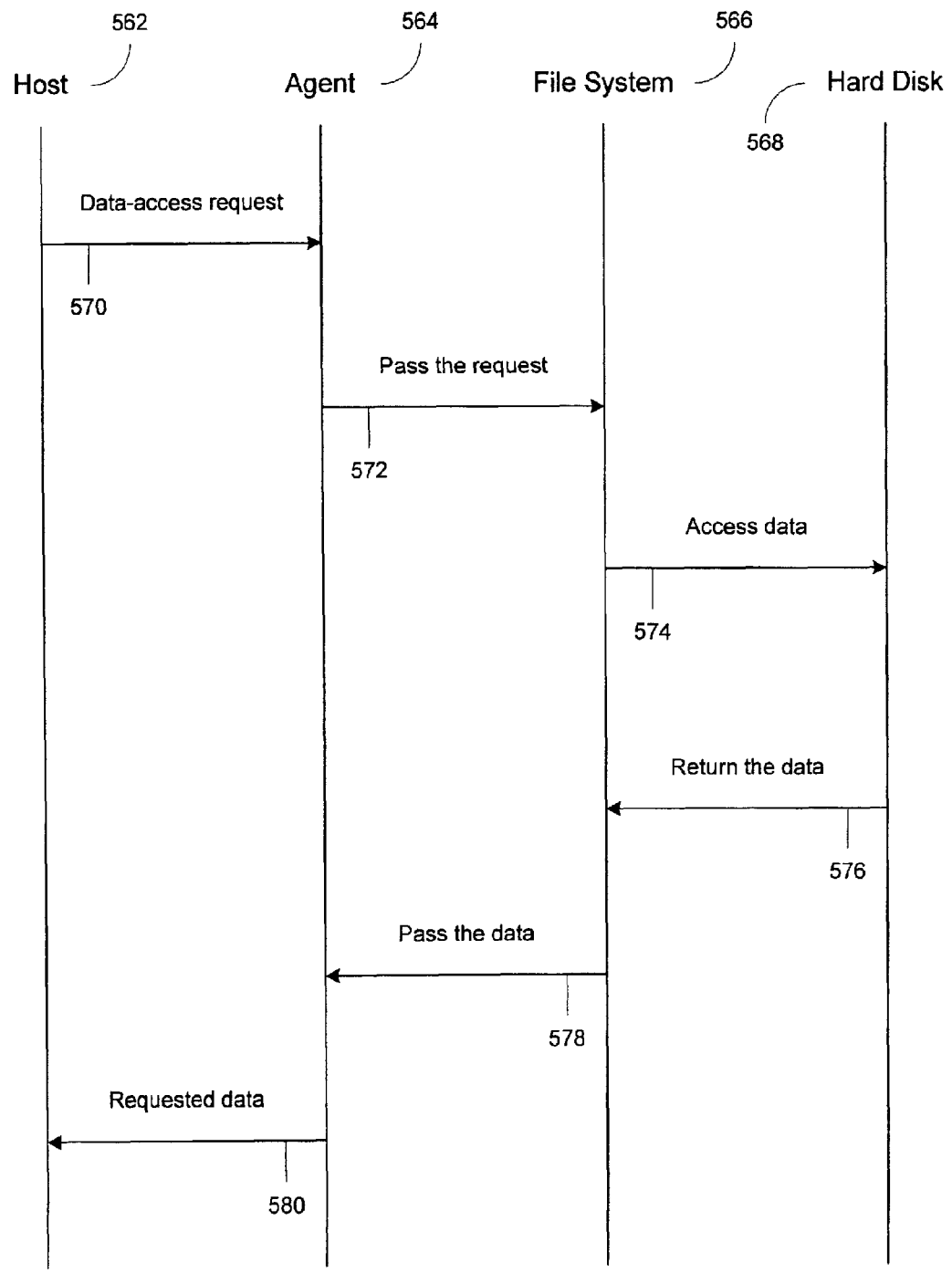
FIG. 11 is a sequence diagram illustrating an exemplary process according to an embodiment of the present invention.

This exemplary data processing system is further illustrated in FIG. 10 in the context relevant for practicing embodiments of the present invention. The figure depicts various components and modules in a block diagram form similar to the one shown in FIG. 8. The diagram of FIG. 10 shows a host 532 and a target device 542 in further detail. The target device also includes a mass storage 552, such as a hard disk using magnetic storage medium. Both systems includes file systems 536 and 548 and device drivers 538 and 550. In this embodiment, the host system 532 accesses data in the remote mass storage medium 552 through a file system 536 and a device driver 538 as if the mass storage device was connected locally. This is done through a communication bus 540. When a data access request is made from an application program 534 on the host computer 532, the request is passed to a special hardware and/or software 544 on the target computer through the communication bus 540. In certain embodiments of the present invention, the target device may contain additional piece of software 546, which is generically termed "agent" in this disclosure. As shown in the figure, the agent software 546 may control the flow of data in the target device, either in the request direction or in the response direction, or both. One exemplary scenario is shown in FIG. 11 as a sequence diagram according to an embodiment of the present invention. The diagram shows interactions between four actors, a host data processing system 562 and an agent program 564, a file system 566, and a hard disk 568 on the target device. As illustrated in the diagram, the data access request flows from the host to the agent (arrow 570) to the file system (arrow 572) and to the hard disk (arrow 574), As stated earlier, low-level operations may be performed by a device driver (not shown in the diagram) between the file system 566 and the hard disk 568. The response from the hard disk then follows in the reverse direction as indicated by arrows, 576, 578, and 580. In at least one embodiment of the present invention, the agent software plays a role to manage data access from a remote, or host, system, as will be illustrated shortly.

Figure 12A:
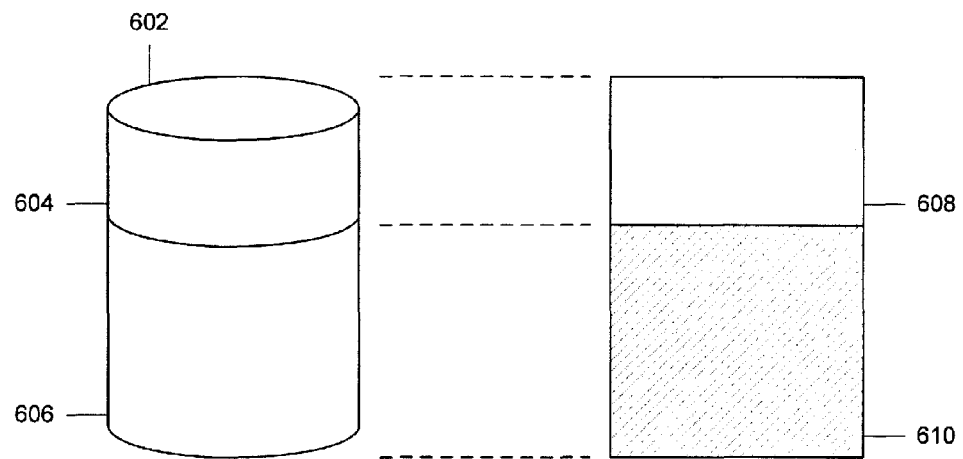
FIG. 12A illustrates an exemplary block storage device and its virtual volumes in accordance with an embodiment of the present invention. The exemplary virtual volume arrangement shown in the figure reflects the fact that the host device is being used in a device mode (e.g., undocked from a host computer).
Figure 12B:
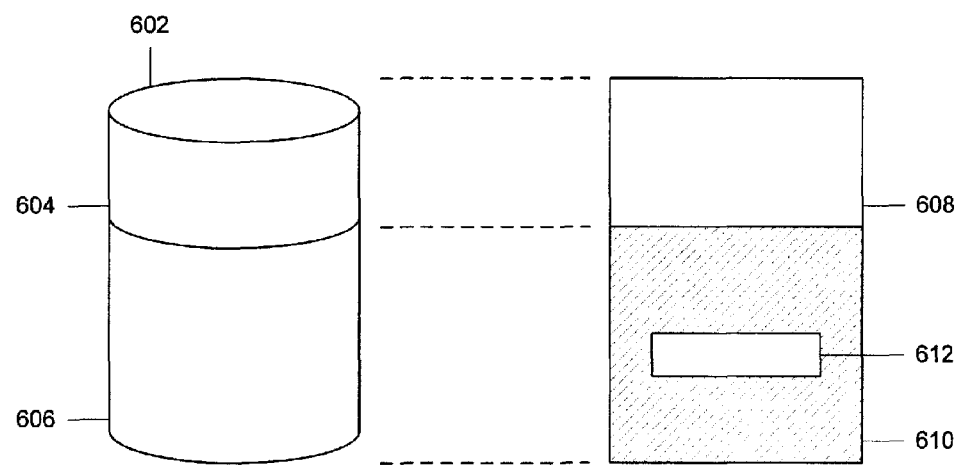
FIG. 12B illustrates an exemplary block storage device and its logical volumes in accordance with an embodiment of the present invention. The exemplary virtual volume arrangement shown in the figure reflects the fact that the host device may have been used in a disk mode (e.g., docked to a host computer).

FIG. 12A illustrates an exemplary block storage device 602 and its virtual volumes according to an embodiment of the present invention. The storage medium of the exemplary storage device is divided into two regions 604 and 606, which correspond to virtual volumes 608 and 610, respectively, as schematically illustrated in the figure. In certain embodiments, this division is based on partitions of the storage medium. In certain other embodiments, this division is logical, and this division is managed by a piece of software such as the agent program of FIG. 10. According to some embodiments of the present invention, the two regions or segments of data area, 608 and 610, are used for different purposes. For example, the first segment may be used for storing personal information and the second segment may be used for storing multimedia content. FIG. 12B illustrates a different snapshot of the exemplary block storage device 602 and its logical volumes 604 and 606. In this figure, the first type of content 612 has been created inside the second segment of the data area 610. This is done when the first data segment 608 becomes full. According to an embodiment of the present invention, this can be initiated by a host system (not shown in the figure), as will be illustrated later, for example, with respect to flow charts of FIGS. 13-18. In certain embodiments, the second segment of data area, 606 or 610, may be "vended" to the host system while the target device (e.g., the system directly coupled to the storage device 602) is in a disk mode (e.g., docked to the host). On the other hand, the target device retains the control over the first segment of data area, 604 or 608, even when it is in a disk mode. This may allow the target system to operate, albeit in limited functionalities, thereby improving the user experience. As stated earlier, the division of storage area into multiple segments (e.g., with the help of a program such as agent 546 of FIG. 10) solves, among other things, the data integrity problem when the storage medium is under the control of multiple data processing systems.

Figure 13:
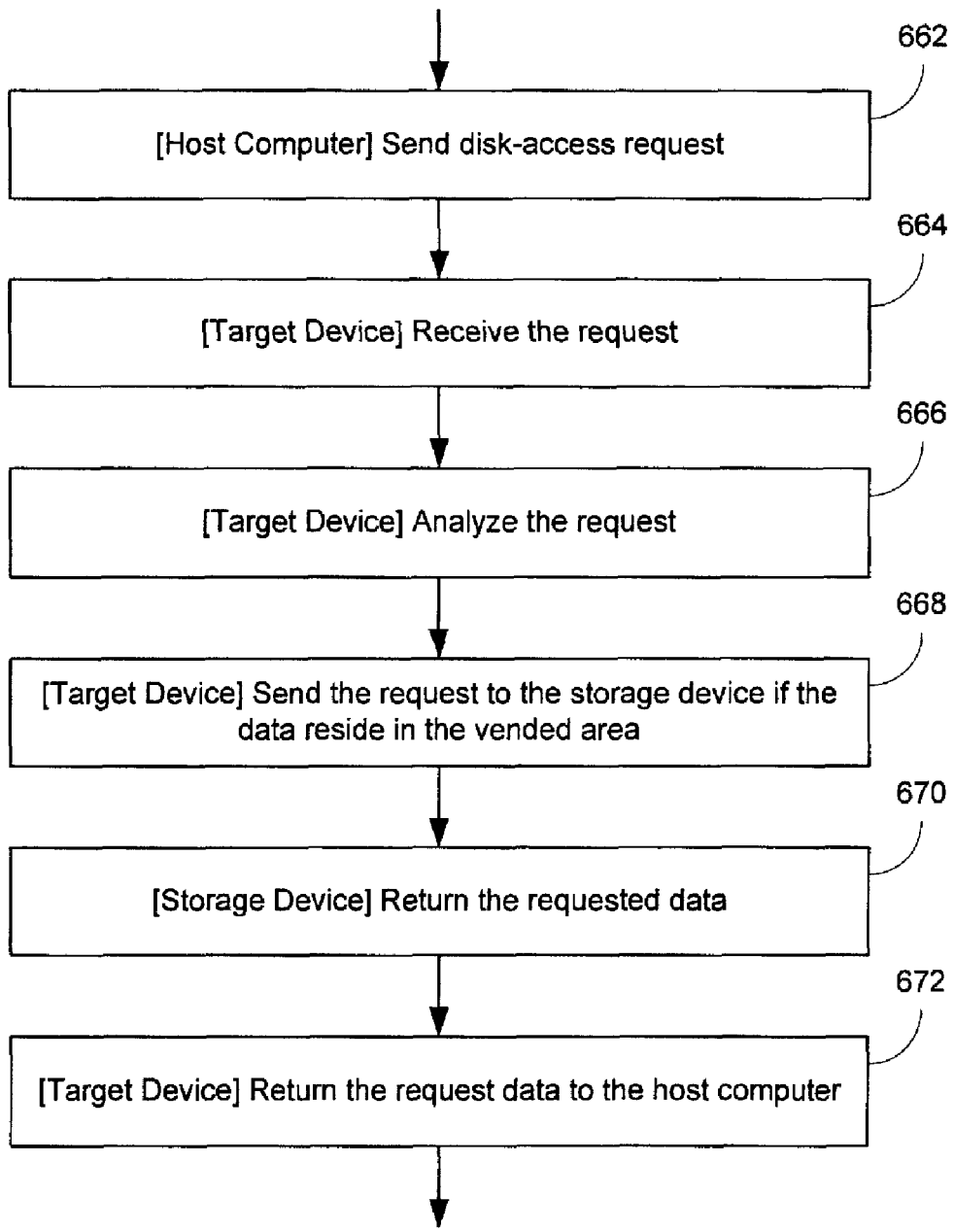
FIG. 13 is a flow chart illustrating an exemplary process according to an embodiment of the present invention. The flow chart depicts a high level interaction between a device and a host computer while the device is in a disk mode, or target mode (e.g., docked to the host).

With reference now to FIGS. 13-18, flow diagrams are shown illustrating various embodiments of the present invention. FIG. 13 shows an exemplary process according to an embodiment of the present invention. The flow chart depicts a high level interaction between a target device having a storage device and a host computer while the device is in a disk mode, or target mode (e.g., docked to the host). The exemplary process begins at block 662 where the host computer sends a disk access request. The request is then analyzed and processed by the target device, at 664 and 666. If the request involves data in the vended area (e.g., the segment of the storage medium over which the host system is supposed to have control while the target device is docked), the request is processed and the result is returned, as illustrated in blocks 668, 670 and 672.

Figure 14:
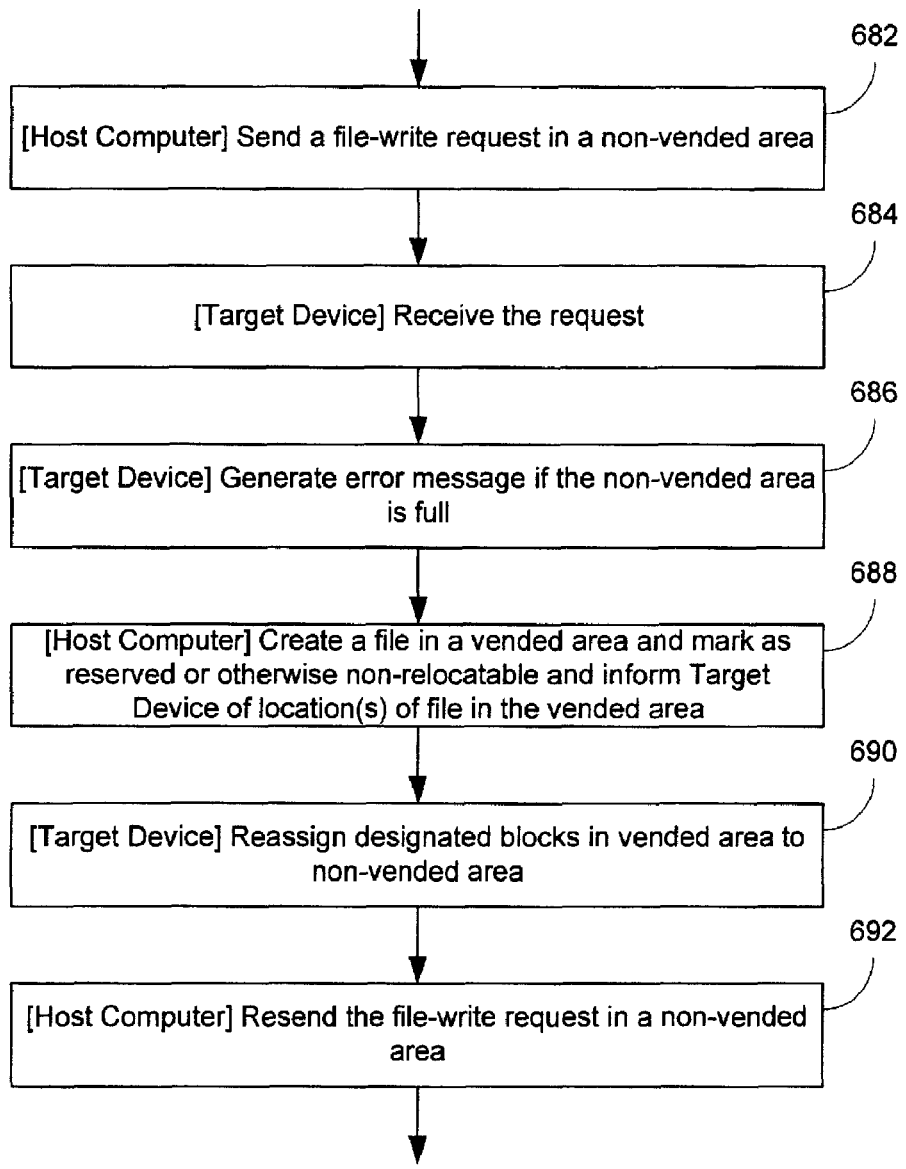
FIG. 14 is a flow chart showing an exemplary process according to an embodiment of the present invention. It illustrates a scenario where the non-vended area of a mass storage medium is too full to accommodate a new file request from a host computer.

FIG. 14 shows a flow chart illustrating an exemplary process according to an embodiment of the present invention when the data access request involves the non-vended area, e.g., the first segment 608 in FIGS. 12A and 12B. More specifically, the flow chart of FIG. 14 illustrates a scenario where the non-vended area of a mass storage medium is too full to accommodate a new file request or other file requests (e.g. a request to modify a file, such as enlarging a file) from the host computer when the target data processing device is coupled to the host computer (or other data processing system) in a disk mode. The host computer sends a file-write request to the storage device through the target data processing device at 682. As stated earlier, in certain embodiments of the present invention, the host system has access only to the vended area. In certain other embodiments the host system may access the whole area of the storage medium. The target data processing device processes the request and it generates an error message if the non-vended area is full, as illustrated in blocks 684 and 686. After receiving the error message, the host system then creates a file in the vended area and marks the file as reserved, or otherwise non-relocatable, at 688. In some cases, the file size may be large enough to accommodate the next data creation request. In some other cases, the file size may be a fixed incremental size such as 512 Mbytes. Once the file is created in the vended area, it is marked as "reserved" or otherwise non-relocatable by the host. The host also informs the target device of the location(s) of the file in the vended area so that the target device can reassign those locations, in the vended area, to the non-vended area. This reassignment is shown as operation 690 in FIG. 14. The host system then resends the file creation request in the non-vended area, at 692. As stated earlier, in certain embodiments of the present invention, the target system has access over the non-vended segment of the data area even when it is in a disk mode, and the file creation request shown in block 682 may be initiated by the target system.

Figure 15:
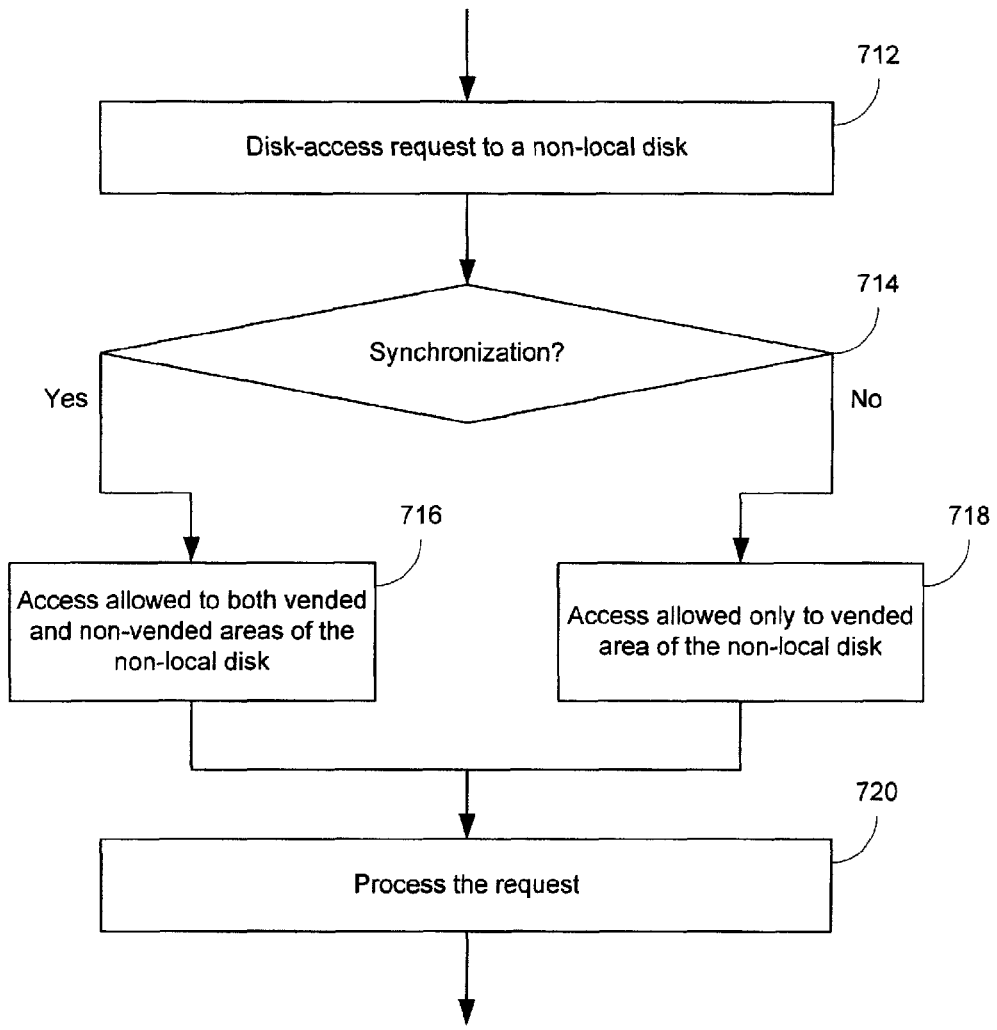
FIG. 15 is a flow chart illustrating an exemplary process according to an embodiment of the present invention. It demonstrates two different data access modes of a host computer.

FIG. 15 is a flow chart illustrating another exemplary process according to an embodiment of the present invention. It demonstrates two different data access modes of a host computer. As stated earlier, the target data processing and the host system may share certain data, and they may need to be "synchronized". This type of data includes personal information such as address and calendars in personal digital assistants (PDAs) or media content in digital media players. As shown in the flow chart, the host computer first sends the disk access request to a non-local disk at 712. If the request is a "synchronization" request, then access is allowed to both vended and non-vended areas, at block 716 following the yes branch at 714. Otherwise, access only to the vended area is allowed, as indicated in block 718. In certain embodiments of the present invention, this management is done by software such as the agent program 546 shown in FIG. 10. The request is then processed at 720. In certain cases, appropriate error messages may be generated.

Figure 16A:
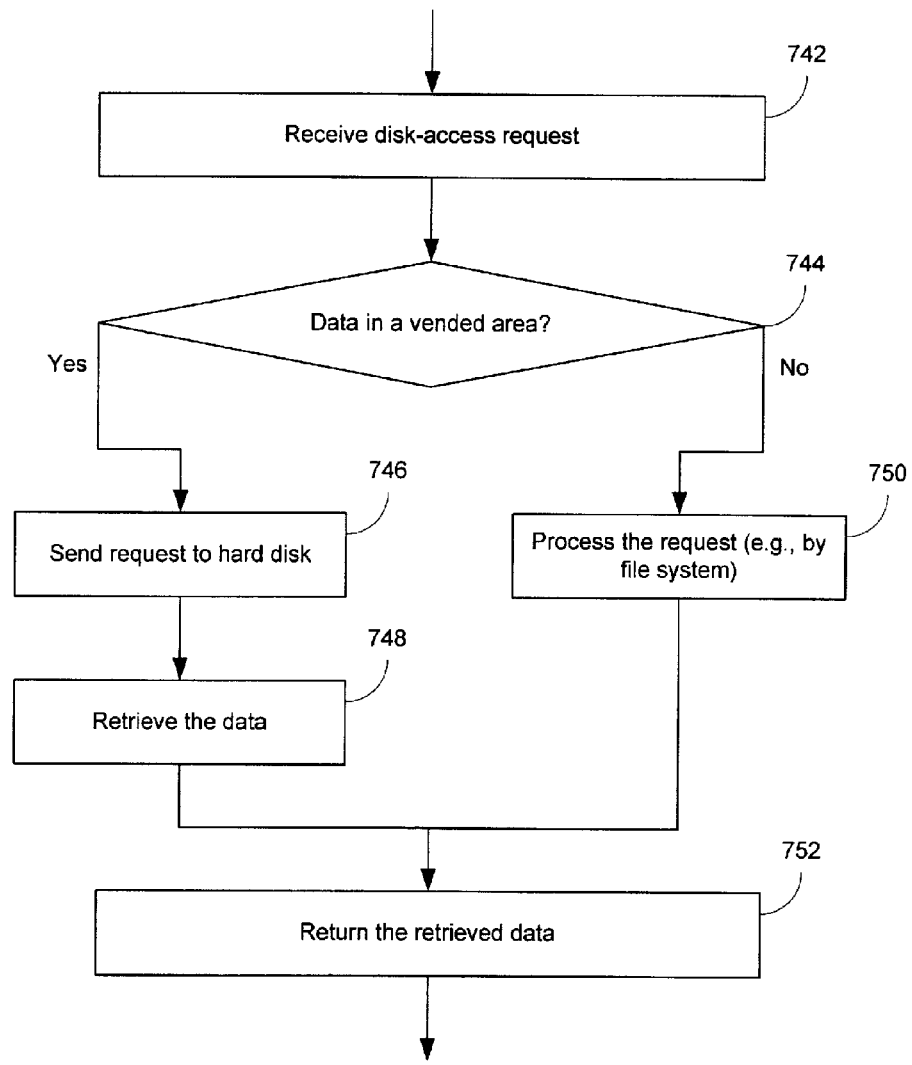
FIG. 16A is a flow chart illustrating an exemplary process according to an embodiment of the present invention. The flow chart shows operations of a target device while the device is in a disk mode.

FIG. 16A shows a flow chart illustrating another exemplary process according to an embodiment of the present invention. In particular, the flow chart shows operations of a target data processing device when the device is in a disk mode. The exemplary process starts when the target system receives a disk-access request at block 742. Next, it is determined whether the request involves data in the vended segment or in the non-vended segment, at 744. If the request is for the data in the vended segment, then the request is sent, either with or without appropriate modification, to the hard disk, at 746, and the requested data is received at 748. If, on the other hand, the request involves data in the non-vended segment, the request is processed by a file system at 750. The response is then returned to the host system, as indicated in block 752.

Figure 16B:
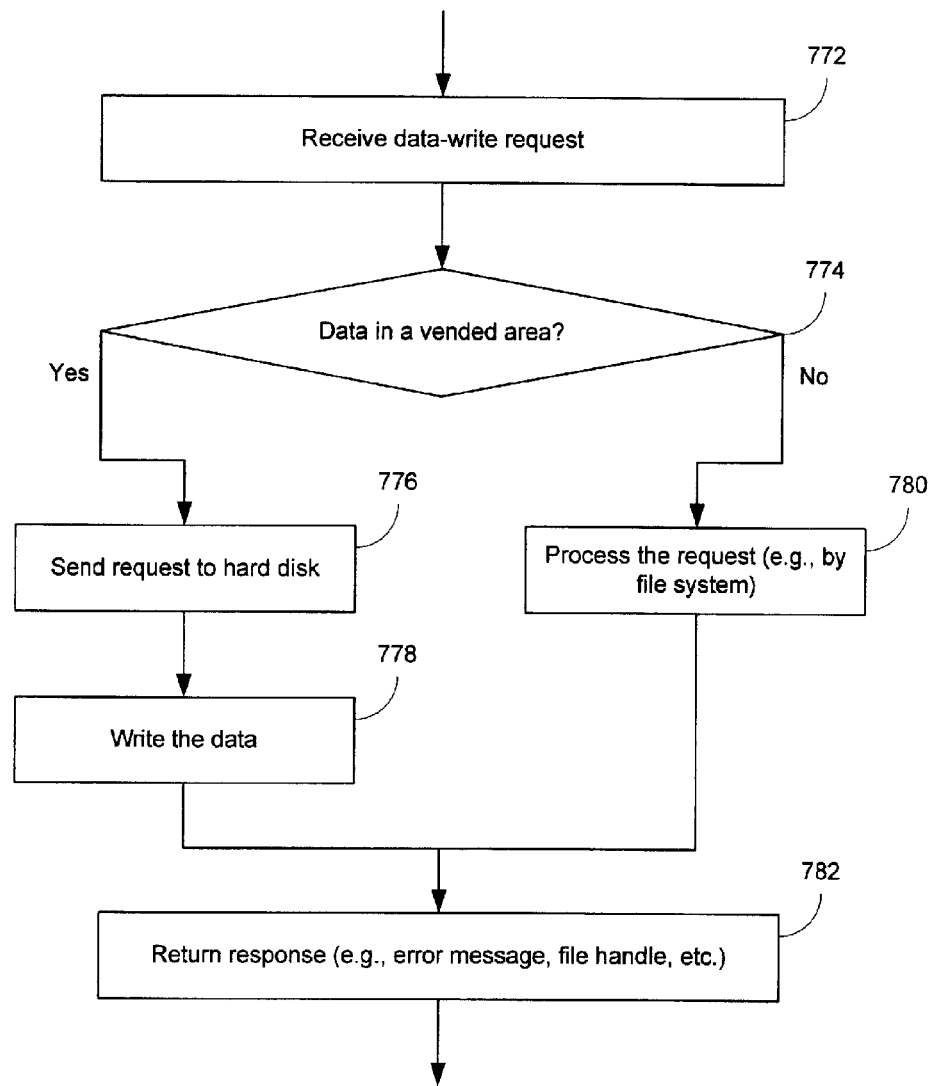
FIG. 16B is a flow chart illustrating an exemplary process according to an embodiment of the present invention. The flow chart shows a scenario in which the non-vended area of a non-local mass storage medium may need to be increased in response to a request from a host computer.

FIG. 16B shows a flow chart illustrating another exemplary process according to an embodiment of the present invention. More specifically, the flow chart shows a scenario in which the non-vended area of a non-local mass storage medium may need to be increased in response to a request from a host computer. The target data processing system receives data-write request at 772, which is first analyzed at 774. If the request involves data in the vended area of the storage device, then the data is written to the hard disk, as indicated in blocks 776 and 778. If not, the request is processed by a file system, at block 780. The result is then returned to the host system at 782.

Figure 16C:
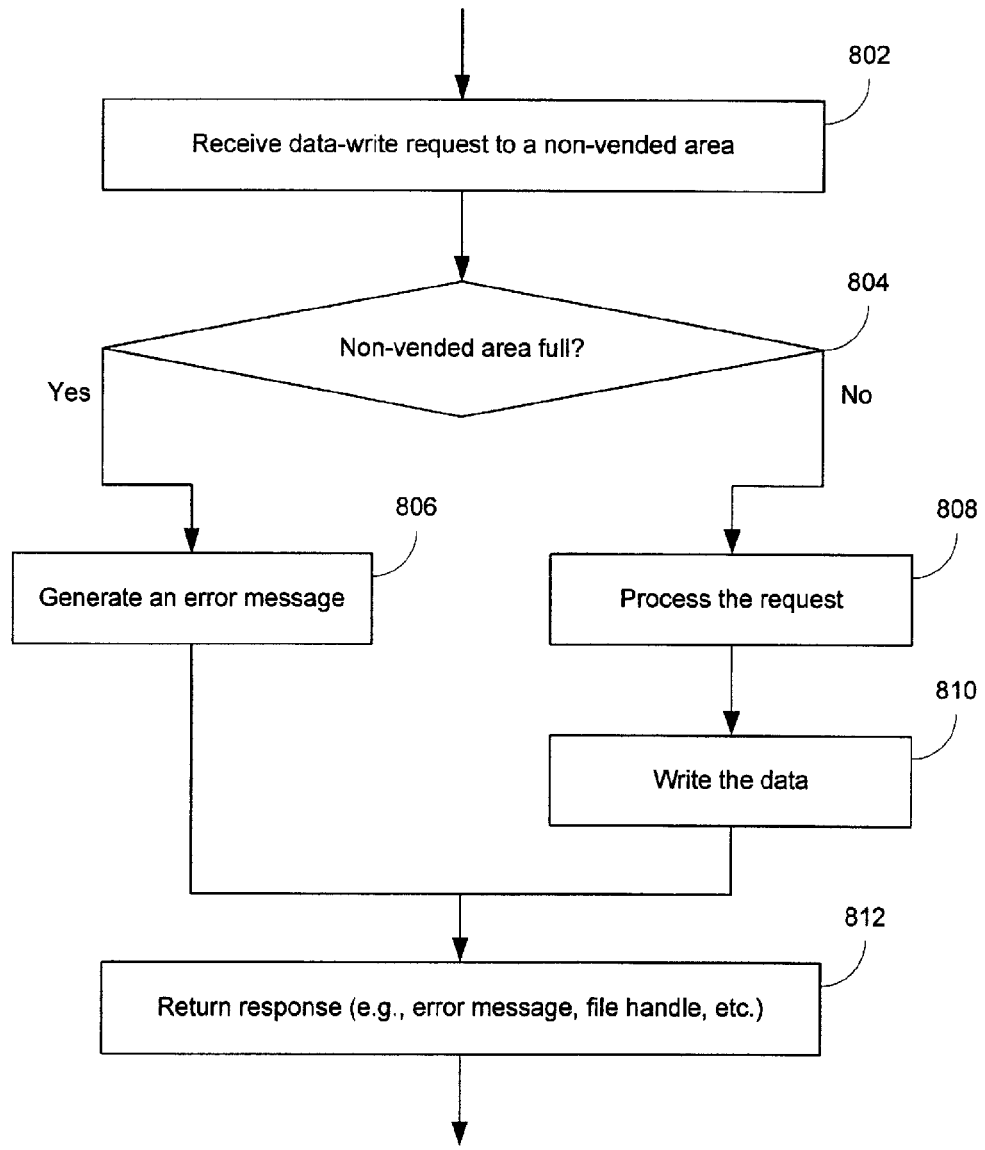
FIG. 16C is a flow chart illustrating another exemplary process according to an embodiment of the present invention for adjusting the size of the non-vended area of a mass storage medium attached to a target device.

FIG. 16C is a flow chart illustrating another exemplary process according to an embodiment of the present invention for adjusting the size of the non-vended area of a mass storage medium attached to a target device. The exemplary process for a target data processing system docked to a host starts by receiving a data-write request to the non-vended area of the storage device at 802. If the non-vended are is full, as determined at 804, then the target device generates an error message at 806. Otherwise, the request is processed and the data is written to the hard disk at 808 and 810. The response, e.g., an error message or a file handle, etc., is then returned to the host system as illustrated in block 812.

Figure 17A:
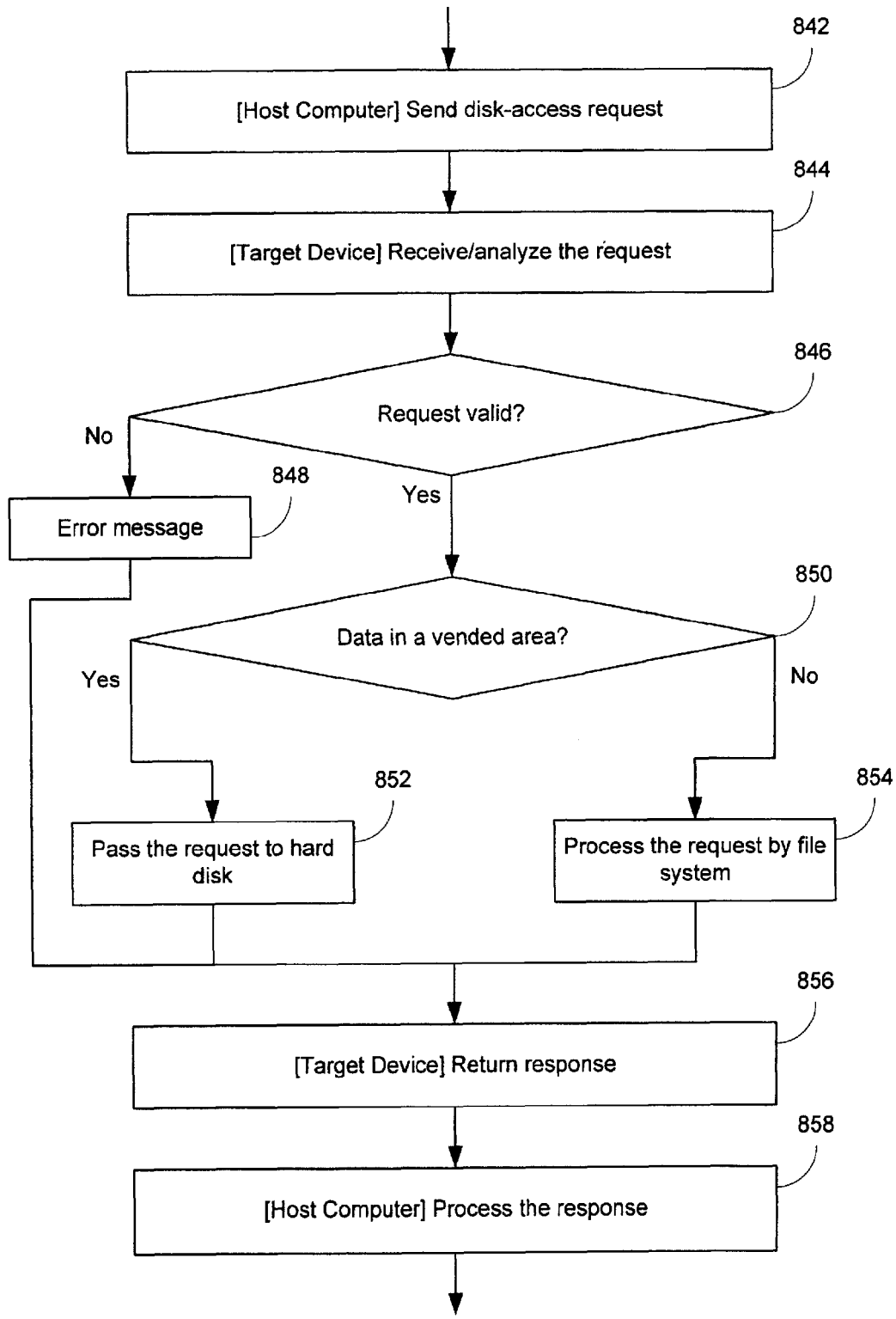
FIG. 17A is a flow chart depicting a process according to an embodiment of the present invention. The flow chart shows an exemplary interaction between a device and a host computer while the device is in a disk mode.
Figure 17B:
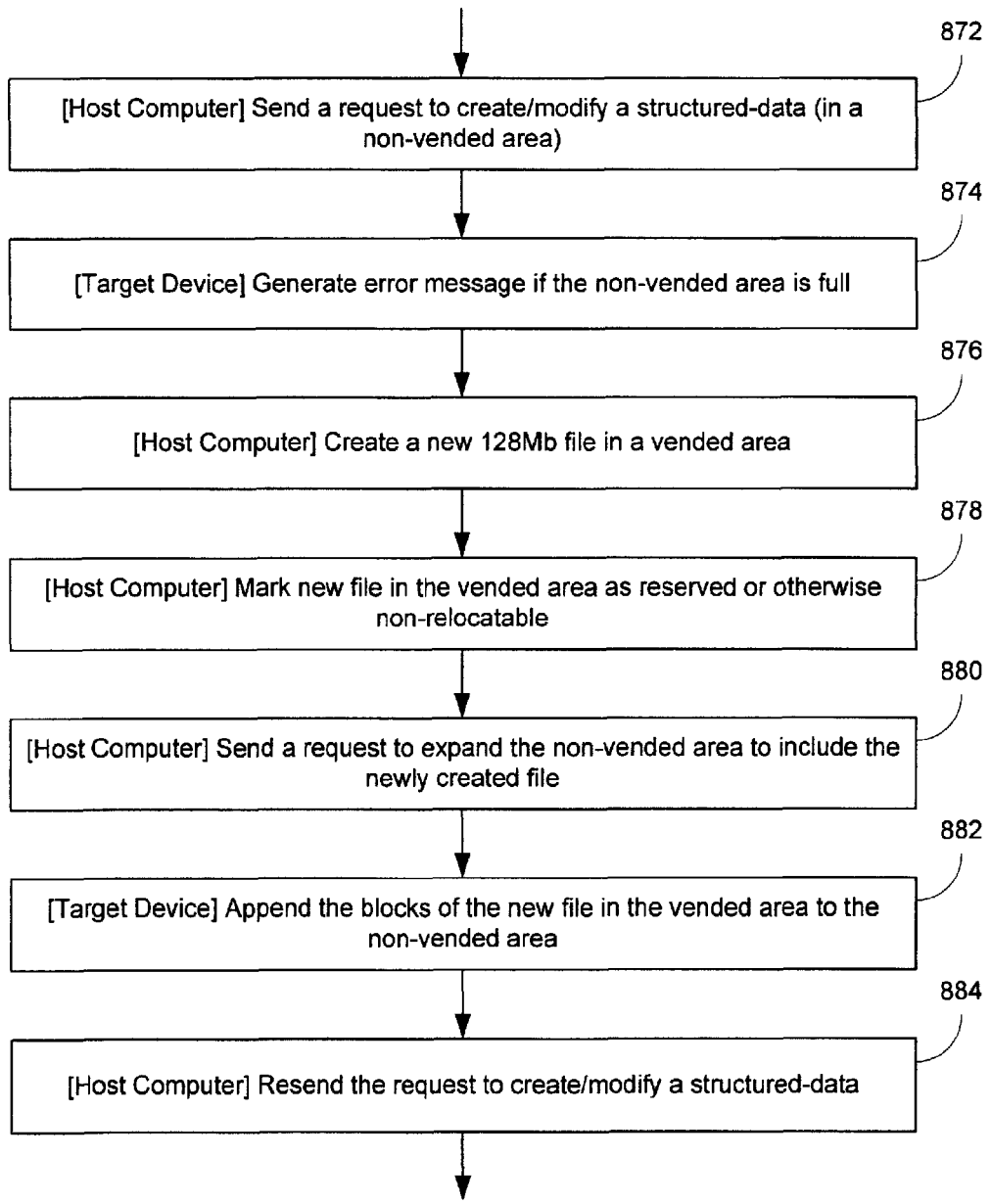
FIG. 17B is a flow chart depicting an exemplary process according to an embodiment of the present invention. The flow chart illustrates a method for adjusting the size of the non-vended area of a mass storage medium attached to a target device.

Referring now to FIGS. 17A and 17B, various exemplary processes are shown illustrating interaction between a target data processing device and a host computer while the device is in a disk mode. FIG. 17A is a flow chart depicting an exemplary process according to an embodiment of the present invention. As shown in the flow chart, the host computer first sends a disk-access request at 842. The request is next analyzed and processed by the target device at 844. If the request is valid, at 846, then the request is further processed through the block 850. Otherwise, an error message may be generated at 848. If the valid request attempts to access data in the vended area, at 850, the request is processed by the hard disk, at 852. Otherwise, it is processed by the file system of the target device, at 854. When the processing is done, the response, including a possible error message, is returned, at 856. The response is then processed by the initiator, as indicated by a block 858.

FIG. 17B is a flow chart depicting another exemplary process according to an embodiment of the present invention. More specifically, the flow chart illustrates a method for adjusting the size of the non-vended area of a mass storage medium attached to a target data processing device. At block 872, the host computer sends a request to create or modify data in the non-vended area. The non-vended area typically contains "structured data" such as the user's address book, etc. If the non-vended area is full, however, the target device generates an error message as indicated in a block 874. Upon receiving the error message, the host computer then creates (or modifies) a file in the vended area, at 876. The file size can be any predetermined size such as 256 Mbytes. The host may then mark the file in the vended area, at 878, to indicate that it is reserved. The file may be designated as unusable on the host computer so that it may not accidentally accessed, deleted, or modified by applications of the host computer. In certain embodiments, the file may be labeled as "RESERVED", which is one of the standard labels of the DOS FAT file system, for example. In other embodiments, the file may be labeled as a "bad" block or as a "system" block or other non-relocatable block. If the file creation request is successful, the host computer sends another command requesting the newly created file (or modified file) to be included in the non-vended area, at 880. Target device then reassigns the blocks which belong to the new file to the non-vended area at 882, thereby effectively increasing the size of the non-vended area. Finally, the host computer resends the initial request to create or modify structured data in the non-vended area, at 884. If the request fails again, the whole process may be repeated to further increase the size of the non-vended area.

Figure 17C:
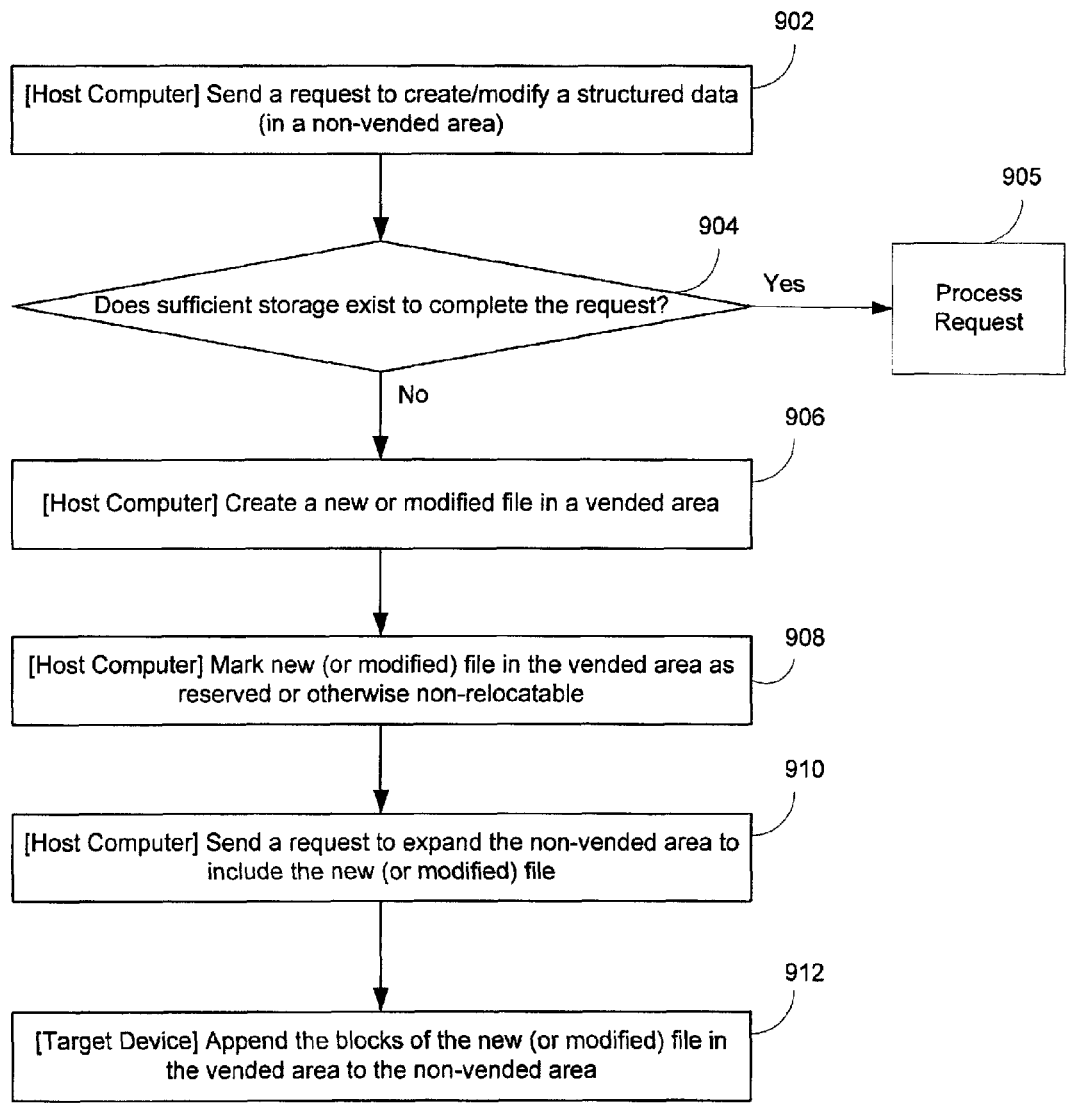
FIG. 17C is a flow chart depicting an exemplary process according to an embodiment of the present invention. It illustrates another method for adjusting the size of the non-vended area of a non-local mass storage device.

FIG. 17C shows another flow chart depicting an exemplary process according to an embodiment of the present invention. It illustrates another method for adjusting the size of the non-vended area of a non-local mass storage device when a target device, in a disk mode, is coupled to a host data processing system. The host data processing system sends a request to create or modify structured data (e.g. contacts in a contact or address book or entries in an electronic calendar or entries in a to do list, etc.) in the non-vended area of the storage device of the target device while it is in a disk mode. If sufficient storage space exists in the non-vended area of this storage device to complete the request, as determined in operation 904, then the request is processed in operation 905. On the other hand, if there is insufficient space in the non-vended area, then the host device, in operation 906, creates a new or modified file in a vended area and marks, in operation 908, the new (or modified) file in the vended area as reserved (or otherwise non-relocatable). The host device, in operation 910, sends a request to the target device to expand the non-vended area, while the target device is in disk mode, to include the new (or modified) file. The target device may then, in operation 912, append the blocks of the new (or modified) file in the vended area to the non-vended area. In this way, the target device's non-vended area is expanded to include a portion of its storage device which was previously in a vended area but is now reassigned to the target device's non-vended area.

Figure 18:
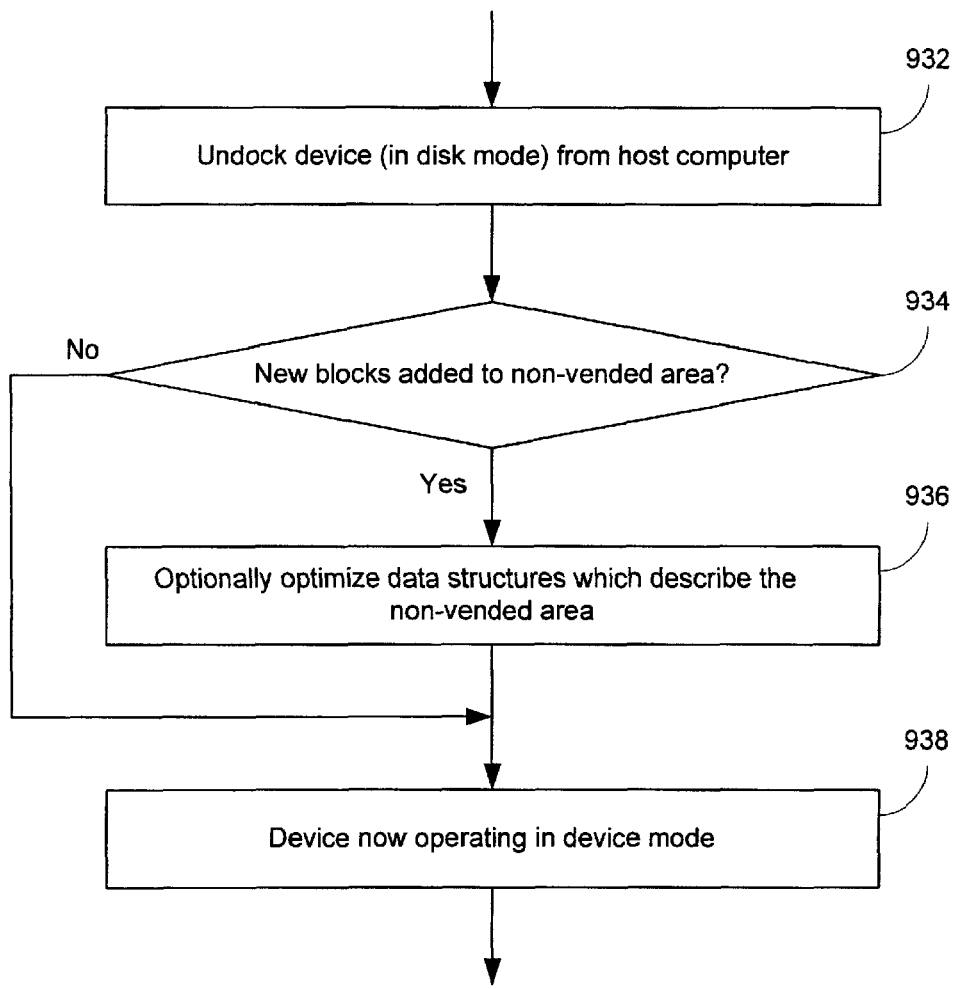
FIG. 18 is a flow chart illustrating a process according to an embodiment of the present invention. It depicts an exemplary process when a device is undocked from a host computer.

As this exemplary process is practiced, there are more and more islands of blocks which logically belong to the non-vended area but physically reside inside the vended area. For example, the set of blocks 612 is inside another segment of data area 610 in FIG. 12B. These fragments of data may be consolidated while the target device is undocked from the host computer. This is illustrated in FIG. 18 as a flow chart according to an embodiment of the present invention. First, the target device undocked or otherwise disconnected from the host, at 932. In certain embodiments, the device may now be in the autonomous mode or device mode. In certain embodiments, some additional operations may be performed before the mode switching is completed, for example, as shown in this flow chart. The storage medium is then analyzed, and if there are any fragmented blocks due to the increase of the non-vended area while the device is operated in the disk mode, at 934, the device optionally optimizes data structures relating to the data blocks, at 936. This can be achieved in various ways as will be clear to skilled artisans in the art. If there has been no increase in the non-vended area, this operation is bypassed, as indicated by the no branch at the block 934. Once the operation is performed, the target device may now be put into the device mode, at 938. This consolidation operation may be performed while the device is the device mode. In some embodiments, this operation may be explicitly initiated by a user. In some other embodiments, this may be done during the "idle time" of the data processing device.

Thus, methods and apparatuses for storage management in a data processing device have been provided. Embodiments of the present invention may be used for increasing the speed and resource utilization of a computer system in which a first computer uses a second computer as an extra hard disk. According to an embodiment, the hard disk associated with the second computer is divided into two or more segments or virtual volumes, and at least one volume is managed by the second computer even in a disk mode. In some cases, this makes the second computer usable while in the docked state and hence it improves the user experience. In certain embodiments, an extra software component other than the file system is employed on the second computer to manage the storage device. Certain volumes may be dynamically increased or decreased while the second computer is in a disk mode. While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the broad spirit and scope of the invention as set forth in the appended claims. Accordingly, the specification and drawings are to be regarded in an illustrative rather than a restrictive sense.

What is claimed is:

1. A data processing device comprising:
 a processor;
 a mass storage device coupled to said processor, said mass storage device comprising a first segment of data area and a second segment of data area, wherein said first segment of data area is accessible when the data processing device is in a disk mode and wherein said first segment of data area and said second segment of data area are accessible when the data processing device is in a device mode;
 a communication interface coupled to said processor, said communication interface for receiving commands when the data processing device is in said disk mode, wherein the second segment of data area is accessible to another system through the communication interface when the data processing device is in said disk mode;
 a memory coupled to said processor, wherein said memory contains a set of machine instructions, when executed by said processor, for executing at least one command from said communication interface, and wherein the data processing device is capable of autonomous processing of data when in device mode and wherein the second segment of data area is not accessible to the data processing device when in the disk mode;

a user interface coupled to said processor, wherein said user interface is configured to respond to a user input when said data processing device is in said disk mode, and wherein access to blocks in the second segment is performed at the block level by the another system and wherein locking of blocks in the second segment from access by the data processing system, when in the disk mode, is done at the block level;

and wherein said at least one command comprises a command to access data in said mass storage device, and wherein the data processing device in device mode performs processing functions including at least one of presenting a calendar or presenting a list of contacts or presenting audio media or presenting video media and wherein the first segment is changeable in size when the data processing device is disk mode.

2. The data processing device of claim 1, wherein:
said communication interface comprises at least one of (a) a USB (universal serial bus) interface, (b) an IEEE 1394 interface, (c) a SATA interface, or (d) a wireless interface.

3. The data processing device of claim 1, wherein:
said at least one command comprises one of a SCSI command or a command for a SATA operation or a command for a wireless transfer from a remote data processing system.

4. The data processing device of claim 1, wherein:
said set of machine instructions is different from a file system of the data processing device.

5. The data processing device of claim 1, wherein:
said mass storage device is coupled to said processor through a bus.

6. The data processing device of claim 1, wherein:
said first segment of data area is different from said second segment of data area.

7. An apparatus for data processing, comprising:
a data processing device, said data processing device having a first operational mode and a second operational mode, wherein said data processing device is capable of autonomous processing of data when in said second operational mode;
a storage device coupled with said data processing device, wherein said storage device comprises a first segment of data area and a second segment of data area;
means to switch modes of said data processing device between said first operational mode and said second operational mode, wherein said data processing device has access to said first segment of data area when said data processing device is in said first operational mode and wherein said data processing device has access to said first segment of data area and said second segment of data area when said data processing device is in said second operational mode;
program means for controlling data access to said storage device in response to at least one command given to said data processing device when said data processing device is in said first operational mode, and wherein the second segment of data area is not accessible to said data processing device when in said first operational mode;
and wherein said at least one command comprises one of a SCSI command or a command for a SATA operation or a command for a wireless transfer from a remote computer coupled to said data processing device through a communication interface.

8. The apparatus of claim 7, wherein:
said storage device is a non-volatile storage device.

9. The apparatus of claim 7, wherein:
said storage device comprises a partition, wherein said partition includes said first segment of data area and said second segment of data area.

10. The apparatus of claim 7, wherein:
said storage device is coupled to said data processing device through a bus.

11. The apparatus of claim 7, wherein:
said program means is different from a file system of said data processing device.

12. A data processing system comprising:
a processor;
a communication port coupled to said processor, said communication port configured to be used for communication between the data processing system and a data processing device, said data processing device comprising a mass storage device, wherein said mass storage device comprises a first segment of data area and a second segment of data area, and wherein the data processing device is capable of autonomous processing of data when not connected to the data processing system;
a memory coupled to said processor, said memory containing a first sequence of machine instructions, when executed by said processor, to issue a first command through said communication port to access data in said mass storage device, and a second sequence of machine instructions, when executed by said processor, to issue a second command through said communication port to access data in said second segment of data area of said mass storage device; and
means to connect the data processing system to said data processing device, said means coupled to said communication port, wherein said data processing system has access to said first segment of data area when said data processing device is connected to the data processing system, and wherein the second segment of data area is not accessible to the data processing device when said data processing device is connected to the data processing system.

13. The data processing system of claim 12, wherein:
said communication port comprises at least one of (a) a USB (universal serial bus) interface, (b) an IEEE 1394 interface, (c) a SATA interface, or (d) a wireless interface.

14. The data processing system of claim 12, wherein:
said second command comprises one of a SCSI command or a command for a SATA operation or a command for a wireless transfer.

15. The data processing system of claim 12, wherein:
said mass storage device comprises a non-volatile storage device.

16. The data processing system of claim 12, wherein:
said first sequence of machine instructions is different from a file system of the data processing system.

17. A method to be used with a data processing device having a mass storage device, wherein the mass storage device comprises a first segment of data area and a second segment of data area, the method comprising:
switching modes to a first operational mode when the data processing device is connected to a data processing system, wherein the data processing device has access to the first segment of data area and said data processing system has access to the first segment of data area and the second segment of data area when the data processing device is in said first operational mode, and wherein the second segment of data area is not accessible to the data processing device when in said first operational mode;

switching modes to a second operational mode when the data processing device is disconnected from said data processing system, wherein the data processing device has access to the first segment of data area and the second segment of data area when the data processing device is in said second operational mode, and wherein the data processing device is capable of autonomous processing of data when in said second operational mode; and processing at least one command from said data processing system when the data processing system is in said first operational mode and wherein said at least one command comprises a command to access data in the mass storage device.

18. The method of claim 17, wherein:
the data processing device is configured to respond to a user input when the data processing device is in said first operational mode.

19. The method of claim 17, wherein:
said at least one command comprises one of a SCSI command or a command for a SATA operation or a command for a wireless transfer.

20. A method to be used with a data processing system coupled to a data processing device, the method comprising:
communicating with the data processing device, the data processing device having a mass storage device, wherein said mass storage device comprises a first segment of data area and a second segment of data area, and wherein the data processing device is capable of autonomous processing of data;

connecting to the data processing device, wherein the data processing device has access to said first segment of data area when the data processing device is connected to the data processing system and wherein the data processing system has access to said second segment of data area when the data processing device is connected to the data processing system, and wherein the second segment of data area is not accessible to the data processing device when the data processing device is connected to the data processing system; and sending at least one command to the data processing device when the data processing device is connected to the data processing system and wherein the data processing device is configured to respond to a user input when the data processing device is connected to the data processing system.

21. The method of claim 20, wherein:
said communicating comprises communicating through at least one of (a) a USB (universal serial bus) interface, (b) an IEEE 1394 interface, (c) a SATA interface, or (d) a wireless interface.

22. The method of claim 20, wherein:
said at least one command comprises one of a SCSI command or a command for a SATA operation or a command for a wireless transfer.

23. The method of claim 20, wherein:
said at least one command comprises a command to access data in said mass storage device.

24. A method for use with a data processing system, the method comprising:
connecting the data processing system to a data processing device having a mass storage device, said mass storage device comprising a first segment of data area and a second segment of data area, wherein said data processing device has access to said first segment of data area when said data processing device is connected to the data processing system and wherein the data processing system has access to data in said mass storage device when said data processing device is connected to the data processing system;

communicating with said data processing device with a first program which has access to data in said mass storage device;

communicating with said data processing device with a second program which has access to data in said second segment of data area;

sending a request to said data processing device to increase a size of said first segment of data area;

and wherein said request is generated by said first program; and wherein said sending is performed in response to a communication from said data processing device.

25. The method of claim 24, wherein:
said first program is different from said second program.

26. The method of claim 24, wherein:
said size is a multiple of whole blocks.

27. The method of claim 24, wherein:
said connecting is done through at least one of the following interfaces: (a) a USB (universal serial bus) interface, (b) an IEEE 1394 interface, (c) SATA interface, or (d) a wireless interface.

28. The method of claim 24, wherein:
said first segment of data area is different from said second segment of data area.

29. The method of claim 24, wherein:
said storage device comprises a partition, wherein said partition includes said first segment of data area and said second segment of data area.

30. A method for use with a data processing device, the data processing device having a mass storage device, wherein said mass storage device comprises a first segment of data area and a second segment of data area, the method comprising:
switching modes to a disk mode when the data processing device is connected to a data processing system, wherein said data processing system has access to data in the mass storage device when the data processing device is in said disk mode;

increasing a size of the first segment of data area while the data processing device is in said disk mode;

decreasing said size of the second segment of data area; and switching modes to a device mode when the data processing device is disconnected from said data processing system; and wherein said increasing is done by expanding the first segment of data area to include a set of blocks associated with at least one file in the second segment of data area, wherein said at least one file is created by said data processing system.

31. The method of claim 30, wherein:
said increasing is performed in response to a request from said data processing system.

32. The method of claim 30, wherein:
said increasing is performed at least by a file system program of the data processing device.

33. The method of claim 30, wherein:
said size is a multiple of whole blocks.

34. The method of claim 30, wherein:
said first segment of data area is different from said second segment of data area.

35. The method of claim 30, further comprising:
performing at least one operation in response to a user input when the data processing device is in said disk mode.

36. A method to be used with a data processing device, the data processing device having a mass storage device, wherein said mass storage device comprises a first segment of data area and a second segment of data area, the method comprising:
  switching modes to a device mode when the data processing device is disconnected from a data processing system, wherein the data processing device has access to said first segment of data area and said second segment of data area when the data processing device is in said device mode;
  consolidating blocks in the first segment of data area by moving at least one block in the mass storage device so that said blocks in the first segment of data area are substantially contiguous to each other while the data processing device is in said device mode;
  decreasing a size of the first segment of data area; and
  switching modes to a disk mode when the data processing device is connected to said data processing system.

37. The method of claim 36, wherein:
the mass storage device is a non-volatile storage device.

38. The method of claim 36, wherein:
the mass storage device comprises a partition, wherein said partition includes the first segment of data area and the second segment of data area.

39. A data processing device comprising:
a processor;
a mass storage device coupled to said processor, wherein said mass storage device comprises a first segment of data area and a second segment of data area; and
a memory coupled with said processor, said memory having contained therein sequences of instructions which, when executed by said processor, cause said processor to perform a method, the method comprising:
  switching modes to a first operational mode when the data processing device is connected to a data processing system, wherein the data processing device has access to the first segment of data area and said data processing system has access to the first segment of data area and the second segment of data area when the data processing device is in said first operational mode, and wherein the second segment or data area is not accessible to the data processing device when in said first operational mode; and
  switching modes to a second operational mode when the data processing device is disconnected from said data processing system, wherein the data processing device has access to the first segment of data area and the second segment of data area when the data processing device is in said second operational mode, and wherein the data processing device is capable of autonomous processing of data when in said second operational mode; and wherein the data processing device is configured to respond to a user input when the data processing device is in said first operational mode.

40. A data processing system comprising:
a processor; and
a memory coupled with said processor, said memory having contained therein sequences of instructions which, when executed by said processor, cause said processor to perform a method, the method comprising:
  connecting the data processing system to a data processing device having a mass storage device, said mass storage device comprising a first segment of data area and a second segment of data area, wherein said data processing device has access to said first segment of data area when said data processing device is connected to the data processing system and wherein the data processing system has access to data in said mass storage device when said data processing device is connected to the data processing system;
  communicating with said data processing device with a first program which has access to data in said mass storage device;
  communicating with said data processing device with a second program which has access to data in said second segment of data area; and
  sending a request to said data processing device to increase a size of said first segment of data area; and wherein said sending is performed in response to a communication from said data processing device.

41. A data processing device comprising:
a processor;
a mass storage device coupled with said processor, wherein said mass storage device comprises a first segment of data area and a second segment of data area; and
a memory coupled with said processor, said memory having contained therein sequences of instructions which, when executed by said processor, cause said processor to perform a method, the method comprising:
  switching modes to a disk mode when the data processing device is connected to a data processing system, wherein said data processing system has access to data in the mass storage device when the data processing device is in said disk mode; and
  increasing a size of the first segment of data area; and wherein said increasing is performed in response to a request from said data processing system and wherein at least one operation is performed in response to a user input when the data processing device is in said disk mode.

42. A machine readable medium, the machine readable medium containing machine executable program instructions which, when executed by a data processing device having a mass storage device, causes the data processing device to perform a method, wherein the mass storage device comprises a first segment of data area and a second segment of data area, the method comprising:
  switching modes to a first operational mode when the data processing device is connected to a data processing system, wherein the data processing device has access to the first segment of data area and said data processing system has access to the first segment of data area and the second segment of data area when the data processing device is in said first operational mode, and wherein the second segment of data area is not accessible to the data processing device when in said first operational mode;
  switching modes to a second operational mode when the data processing device is disconnected from said data processing system, wherein the data processing device has access to the first segment of data area and the second segment of data area when the data processing device is in said second operational mode, and wherein the data processing device is capable of autonomous processing of data when in said second operational mode; and
  processing at least one command from said data processing system when the data processing system is in said first operational mode, and wherein the data processing device is configured to respond to a user input when the data processing device is in said first operational mode.

43. A machine readable medium, the machine readable medium containing machine executable program instructions which, when executed by a data processing device having a mass storage device, causes the data processing system to perform a method, wherein said mass storage device comprises a first segment of data area and a second segment of data area, the method comprising:
- switching modes to a disk mode when the data processing device is connected to a data processing system, wherein said data processing system has access to data in the mass storage device when the data processing device is in said disk mode; and
- increasing a size of the first segment of data area; and
- performing at least one operation in response to a user input when the data processing device is in said disk mode.

44. The machine readable medium of claim 43, wherein:
said increasing is performed in response to a request from said data processing system.

45. The machine readable medium of claim 43, wherein:
said increasing is done by expanding the first segment of data area to include a set of blocks associated with at least one file in the second segment of data area, wherein said at least one file is created by said data processing system.

* * * * *